(12) United States Patent
Terahara et al.

(10) Patent No.: US 6,452,701 B1
(45) Date of Patent: Sep. 17, 2002

(54) WAVELENGTH DIVISION MULTIPLEXING COMMUNICATIONS NETWORK SUPERVISORY SYSTEM

(75) Inventors: Takafumi Terahara, Kawasaki; Takeo Osaka, Yokohama; Shin-ichirou Harasawa, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/037,070

(22) Filed: Mar. 9, 1998

(30) Foreign Application Priority Data

Mar. 19, 1997 (JP) .............................................. 9-065231
Apr. 24, 1997 (JP) .............................................. 9-107090

(51) Int. Cl.[7] .......................... H04B 10/16; H04B 10/08
(52) U.S. Cl. ....................................... 359/110; 359/177
(58) Field of Search ............................... 359/124, 125, 359/174, 177, 179, 110

(56) References Cited

U.S. PATENT DOCUMENTS

| | | | | |
|---|---|---|---|---|
| 3,803,405 A | * | 4/1974 | Ohnsorge et al. ............ | 250/199 |
| 4,449,247 A | * | 5/1984 | Waschka, Jr. ................ | 359/110 |
| 5,369,515 A | * | 11/1994 | Majima ....................... | 359/130 |
| 5,493,432 A | * | 2/1996 | Yoneda ....................... | 359/110 |
| 5,500,756 A | * | 3/1996 | Tsushima et al. ............ | 359/174 |
| 5,510,931 A | * | 4/1996 | Suyama ....................... | 359/341 |
| 5,539,557 A | * | 7/1996 | Horiuchi et al. ............. | 359/110 |
| 5,633,741 A | * | 5/1997 | Giles ........................... | 359/124 |
| 5,861,967 A | * | 1/1999 | Mizuochi et al. ............ | 359/130 |
| 5,923,453 A | * | 7/1999 | Yoneyama ................... | 359/177 |
| 6,023,366 A | * | 2/2000 | Kinoshita .................... | 359/341 |
| 6,097,736 A | * | 8/2000 | Proctor ........................ | 370/480 |

* cited by examiner

Primary Examiner—Leslie Pascal
(74) Attorney, Agent, or Firm—Staas & Halsey LLP

(57) ABSTRACT

A supervisory system in a wavelength division multiplexing communications network is provided with a first and a second terminal stations and a repeater unit. The first terminal station transmits a supervisory signal to the second terminal station. The second terminal station transfers the supervisory signal to the repeater unit to be monitored. Paths to a hub station A and a hub station B can be a single path by looping back a supervisory signal output from the hub stations A and B for issuing and terminating the supervisory signal at a first and a second branch stations connected through an optical wavelength multiplexing/demultiplexing unit. If the hub station B loops back a supervisory signal, the supervisory signal output from the hub station A can be returned to the hub station A again after circulating the path. If the path of the supervisory signal is set to allow the signal to pass through all repeater units, only one channel is required for a supervisory signal without lowering the modulation rate during a branching operation, and the repeater unit can receive a supervisory signal without fail.

35 Claims, 32 Drawing Sheets

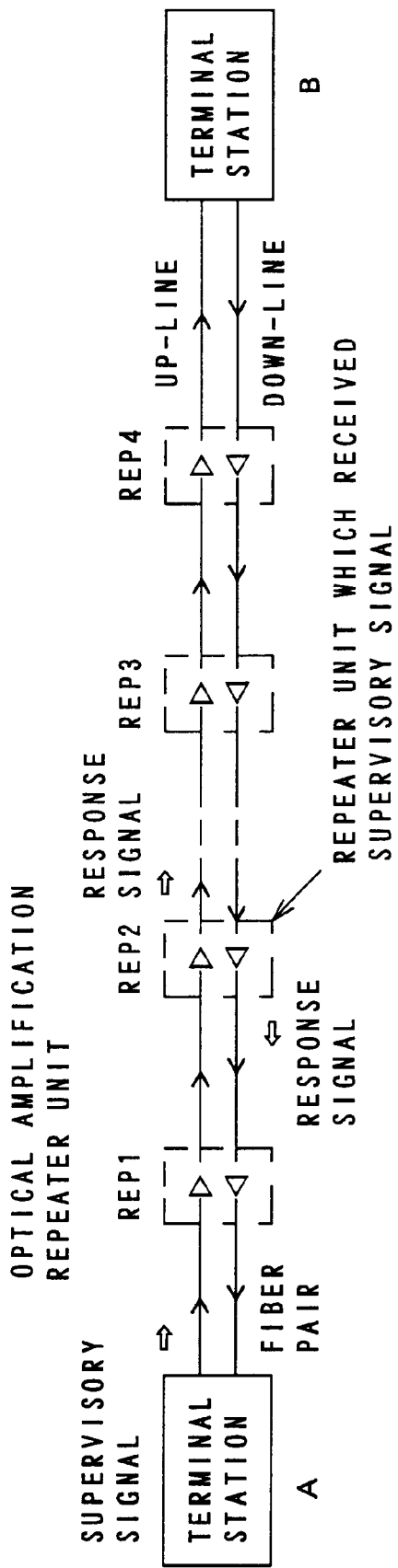
FIG. 1  PRIOR ART

PRIOR ART
FIG. 2A
PRIOR ART
FIG. 2C
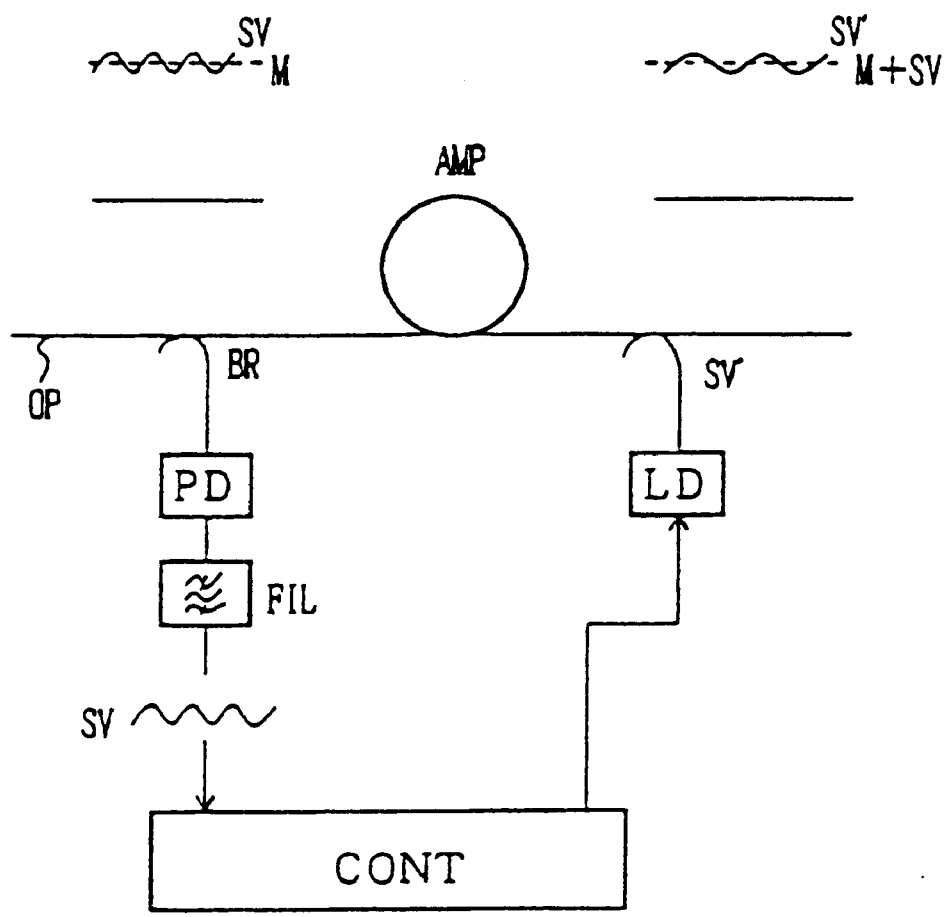
FIG. 2B    PRIOR ART

FIG. 3A    PRIOR ART
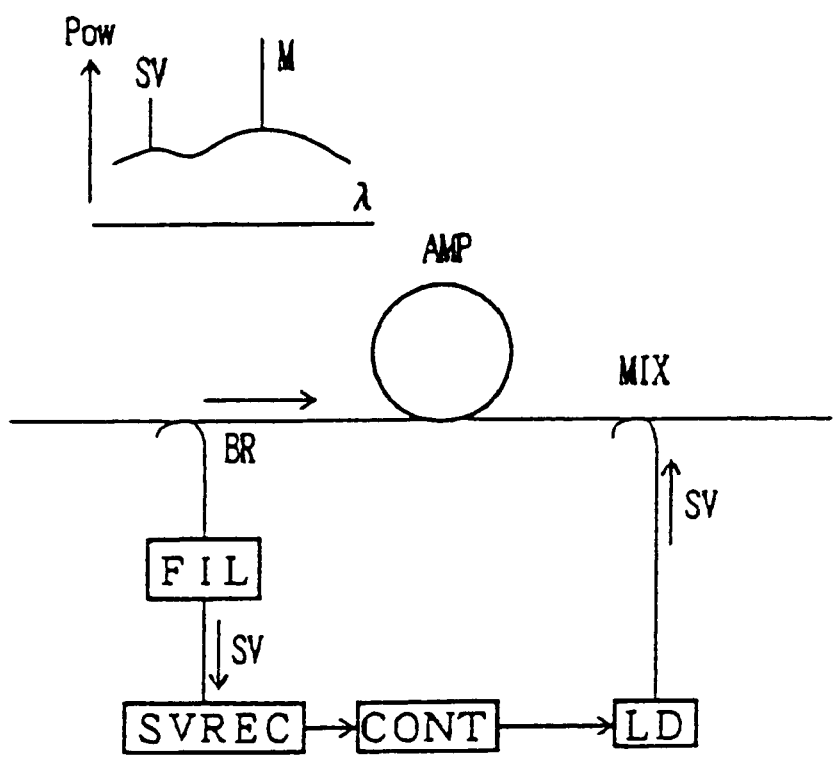
FIG. 3B    PRIOR ART

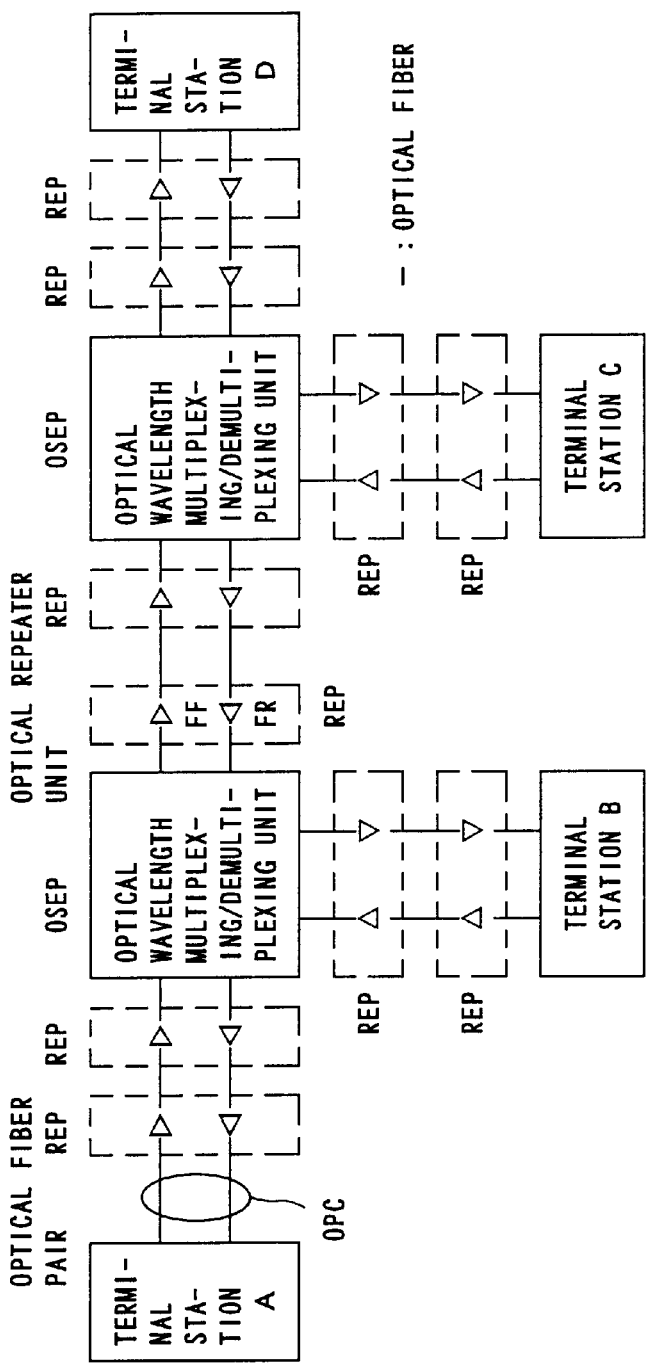
FIG. 4A PRIOR ART
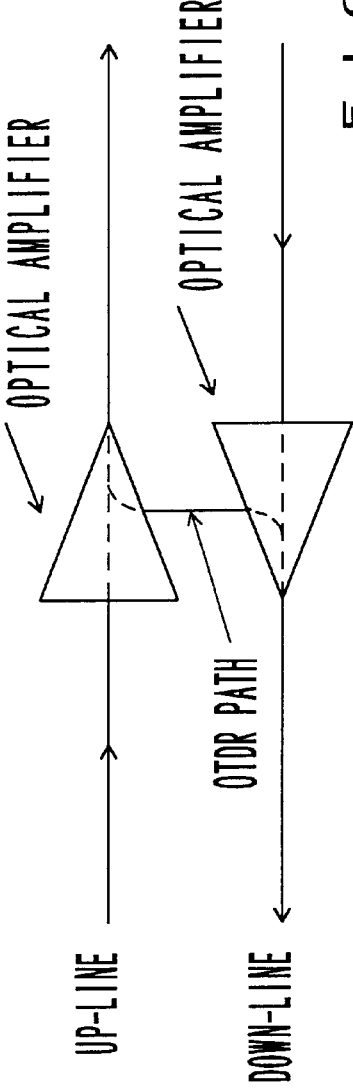
FIG. 4B PRIOR ART

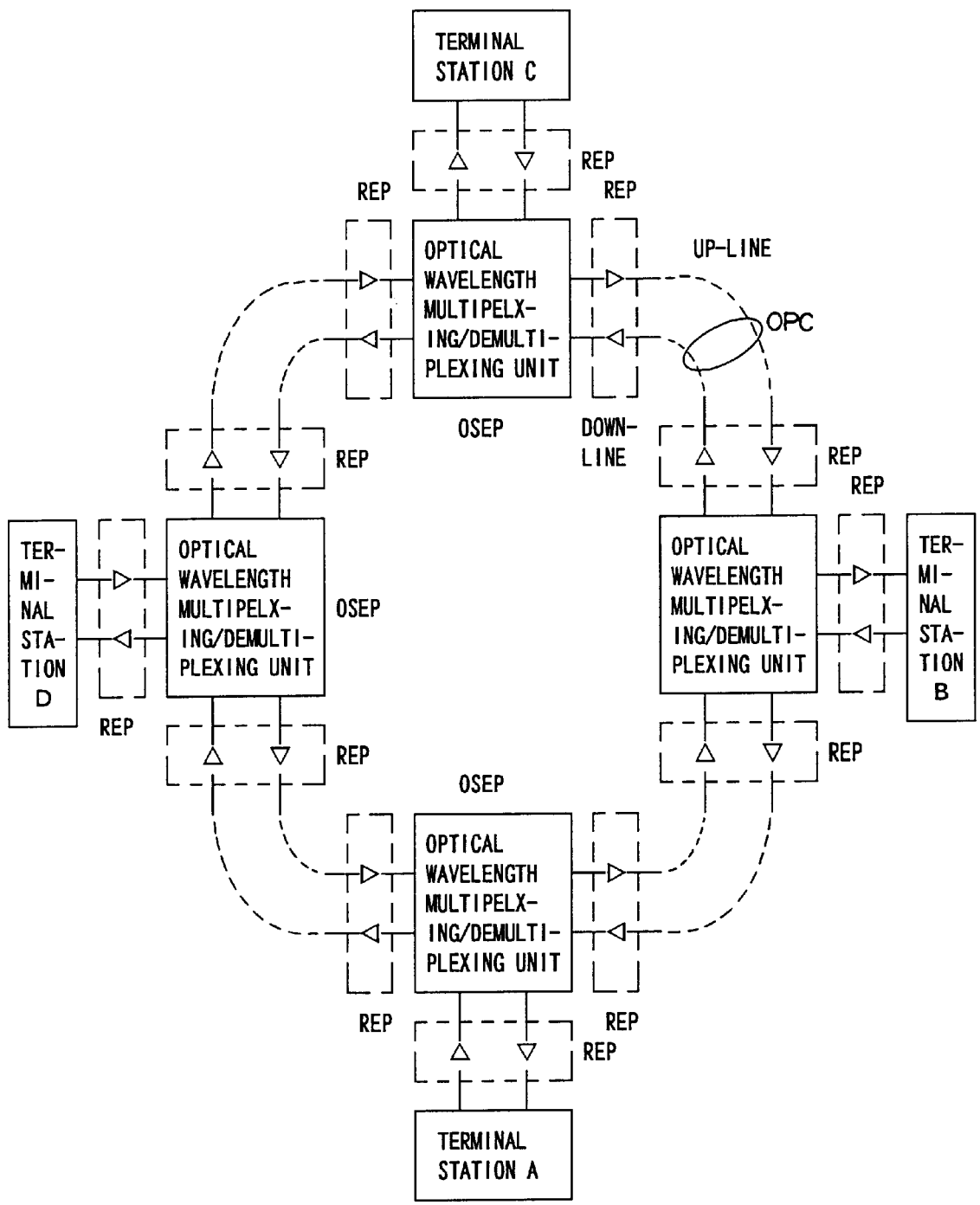
FIG. 5  PRIOR ART

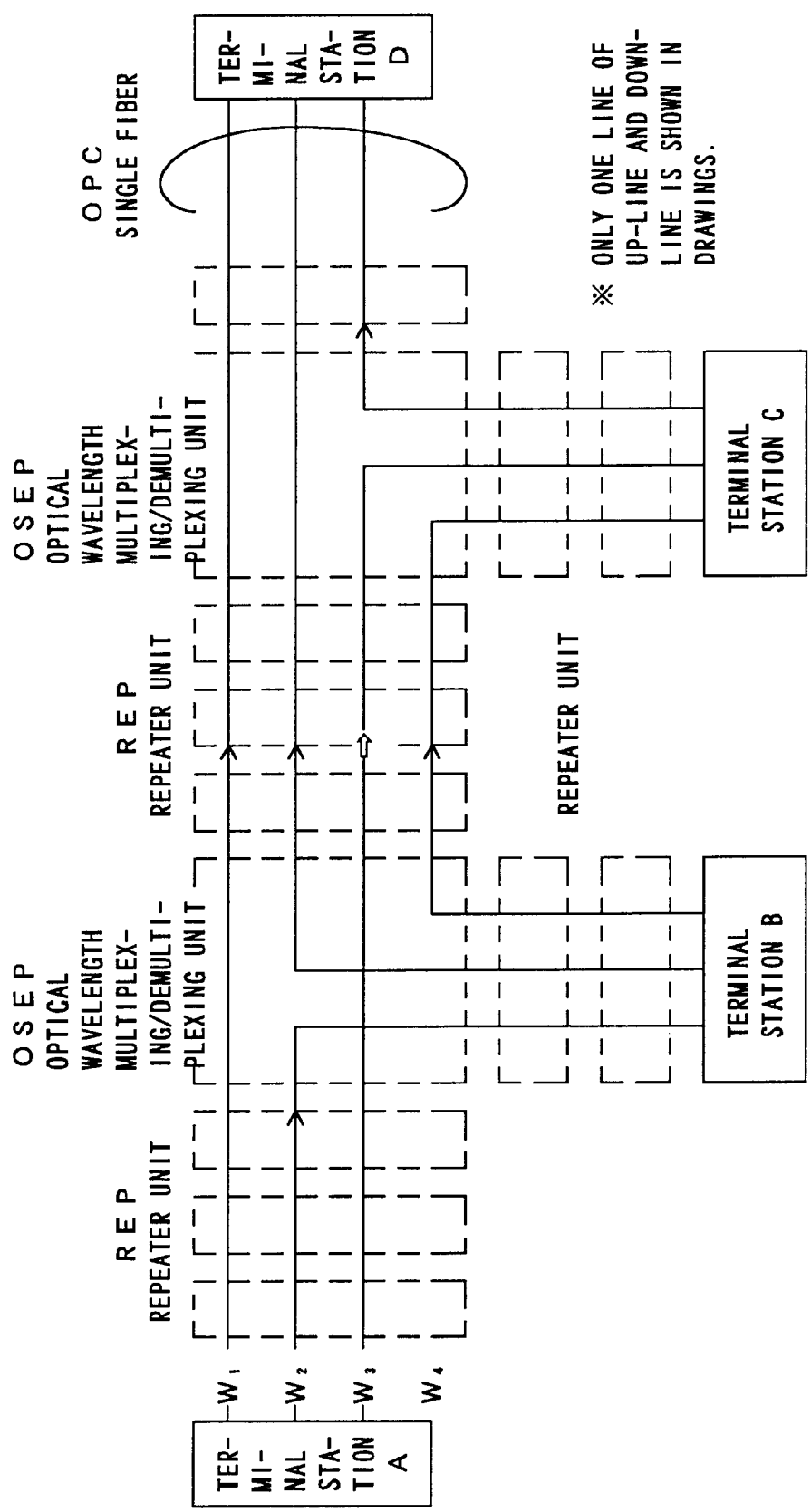
FIG. 6  PRIOR ART

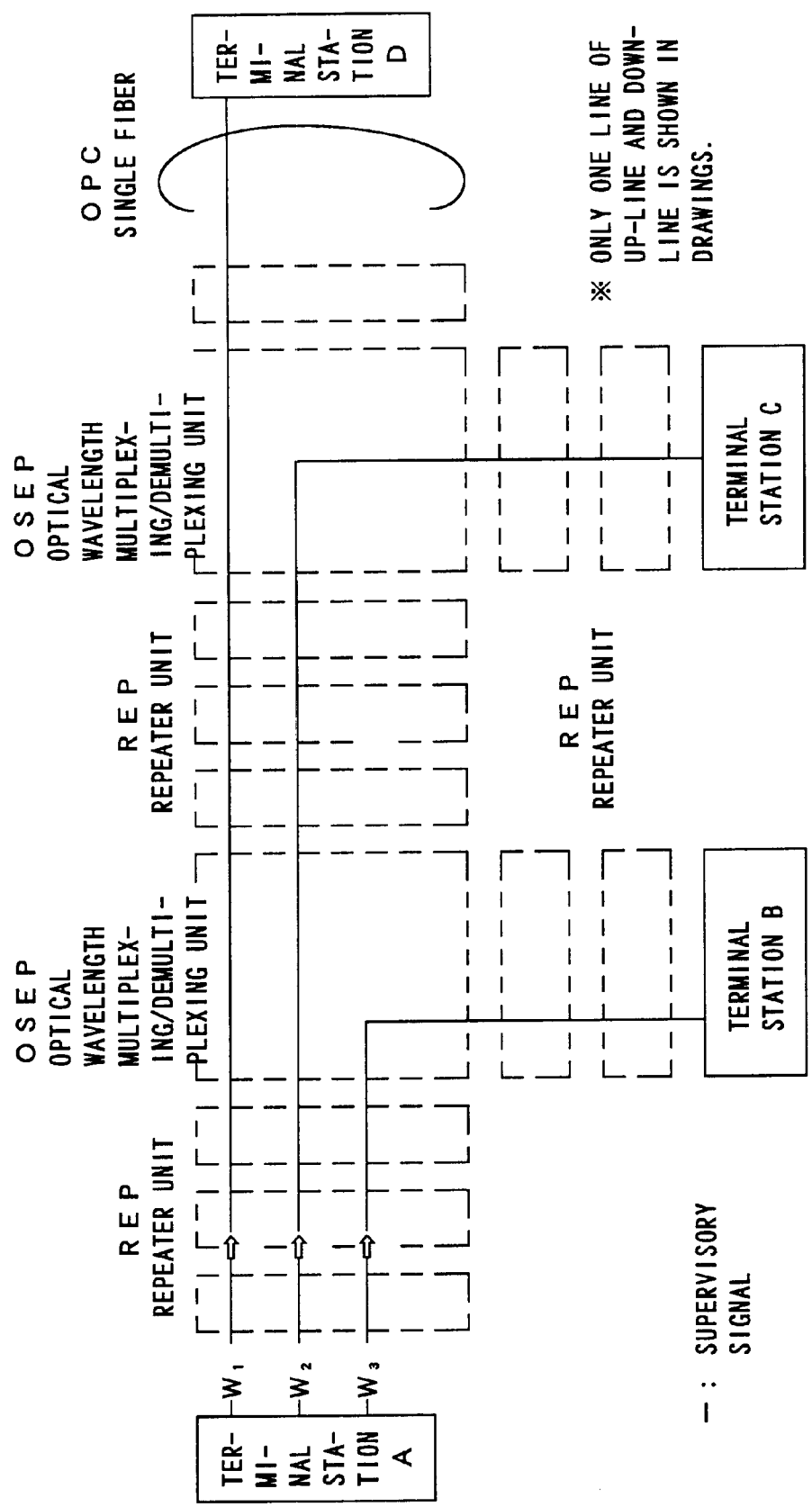
FIG. 7  PRIOR ART

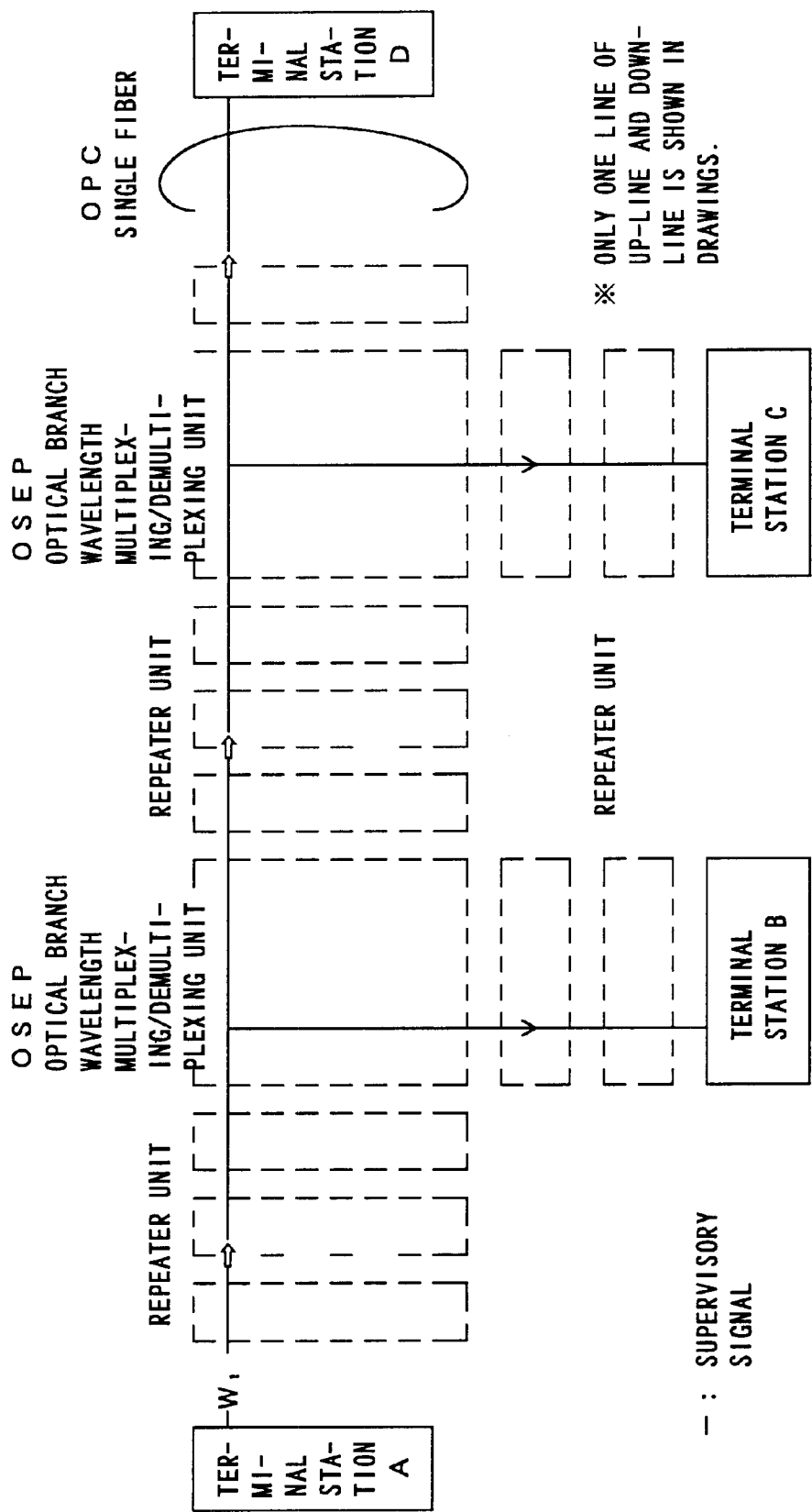
FIG. 8  PRIOR ART

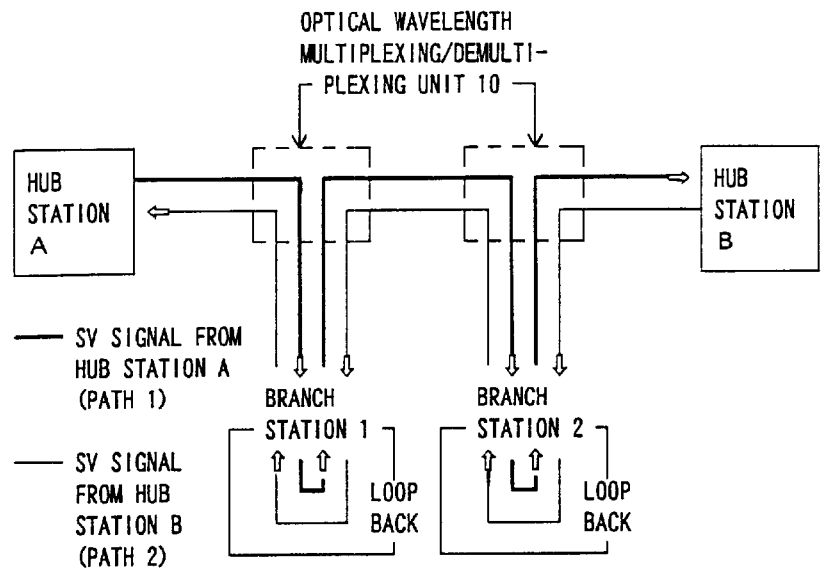
FIG. 9A
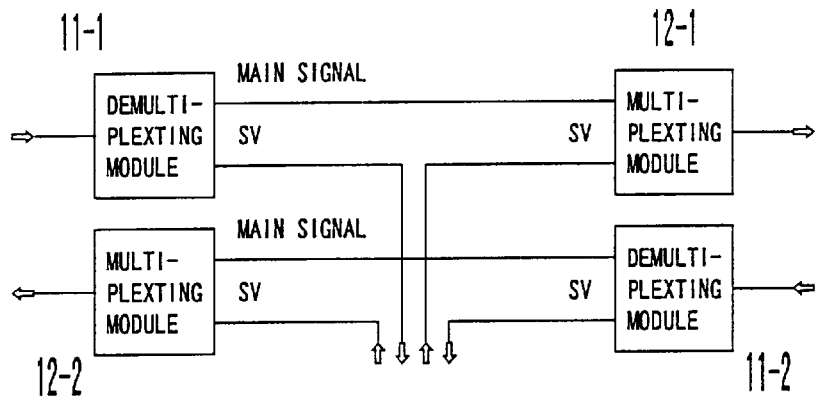
FIG. 9B
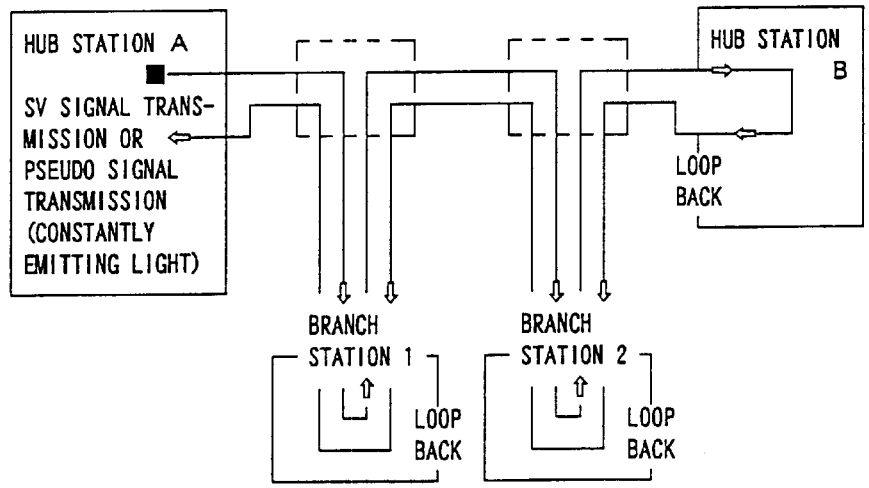
FIG. 9C

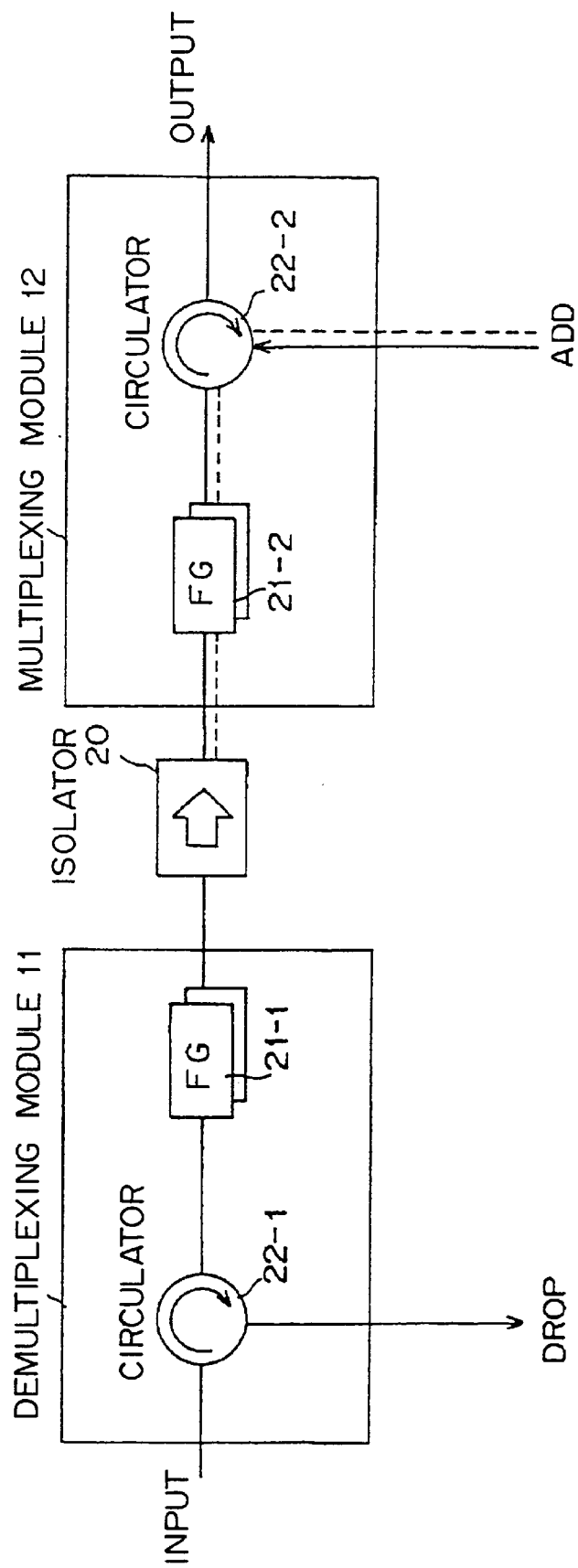
FIG. 10

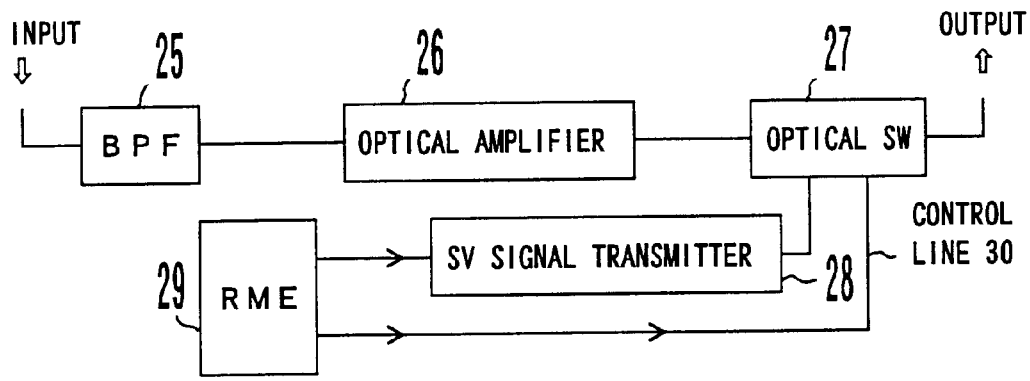
FIG. 11A
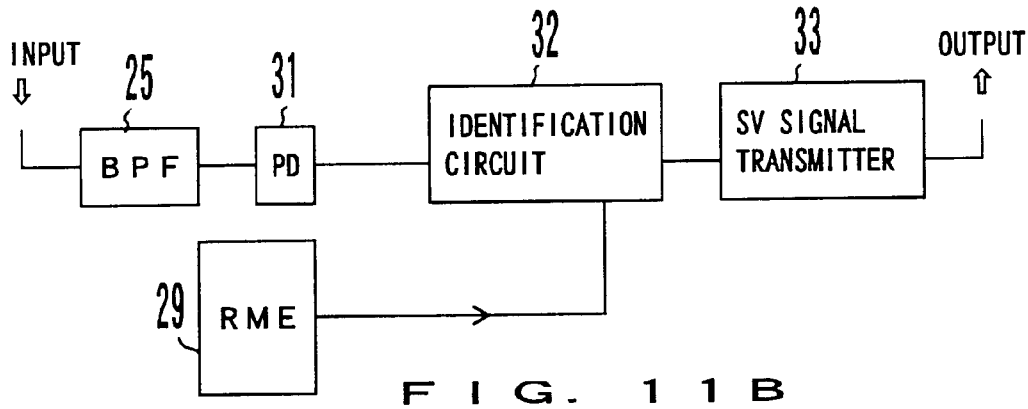
FIG. 11B
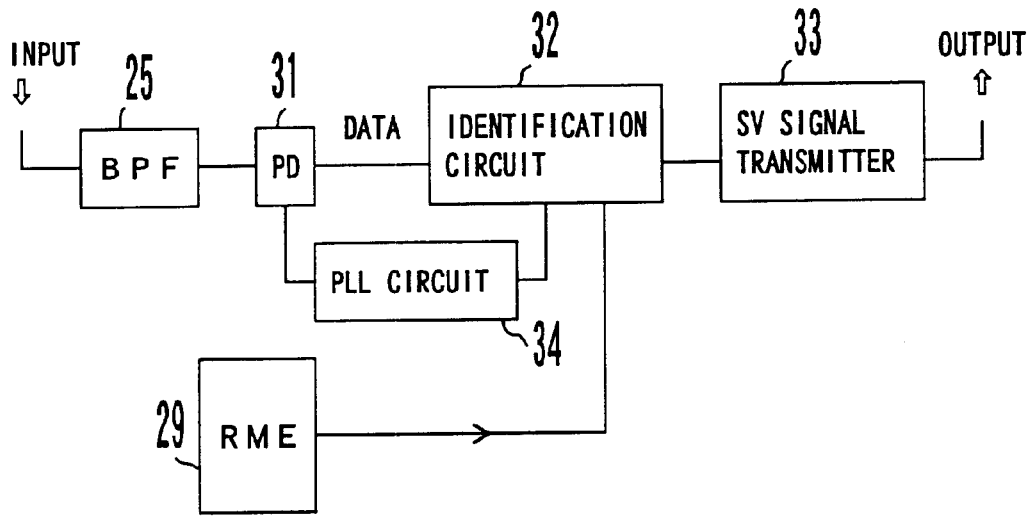
FIG. 11C

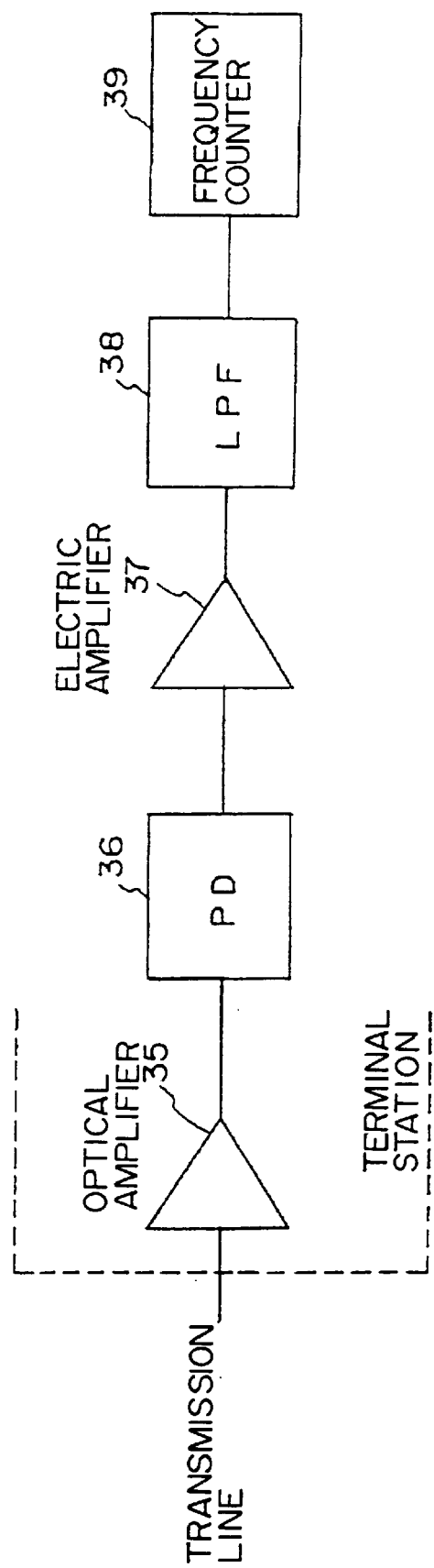
FIG. 12

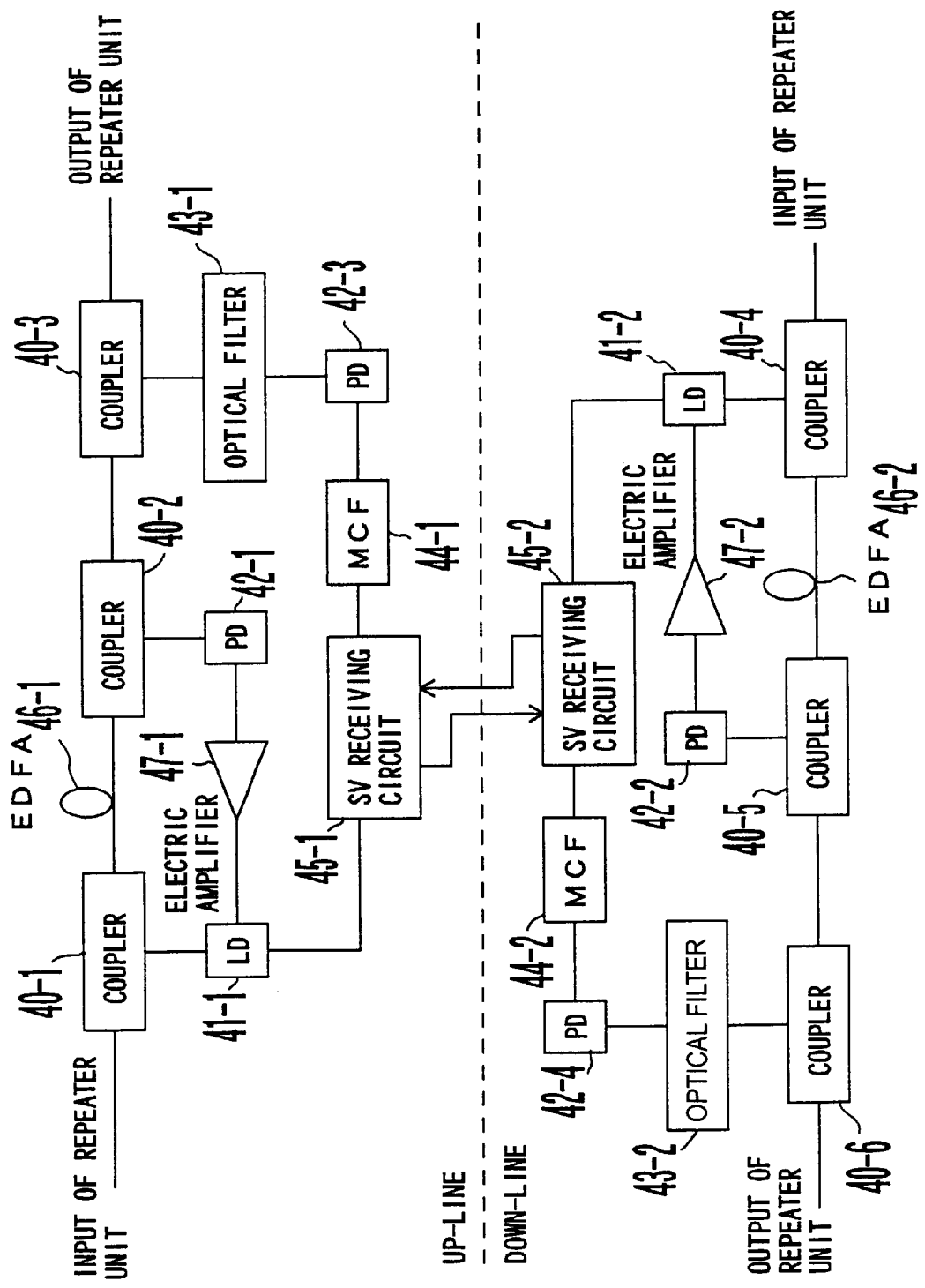
FIG. 13

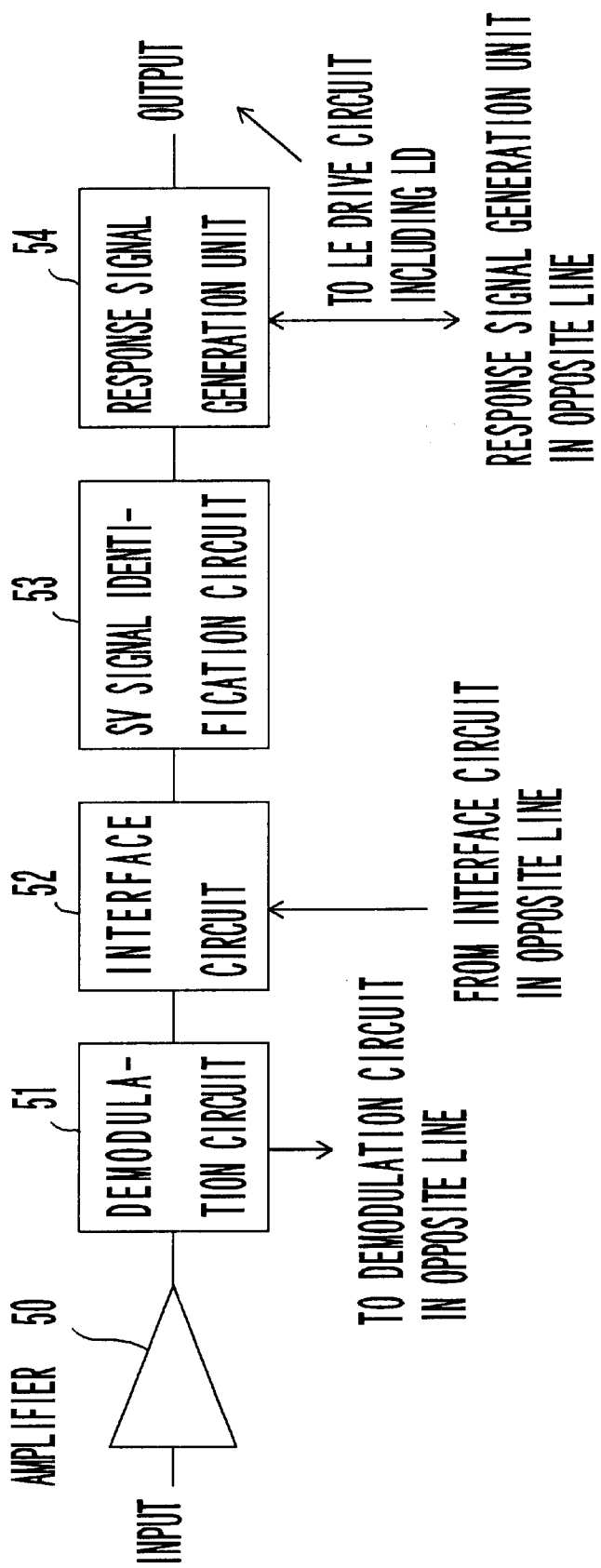
FIG. 14

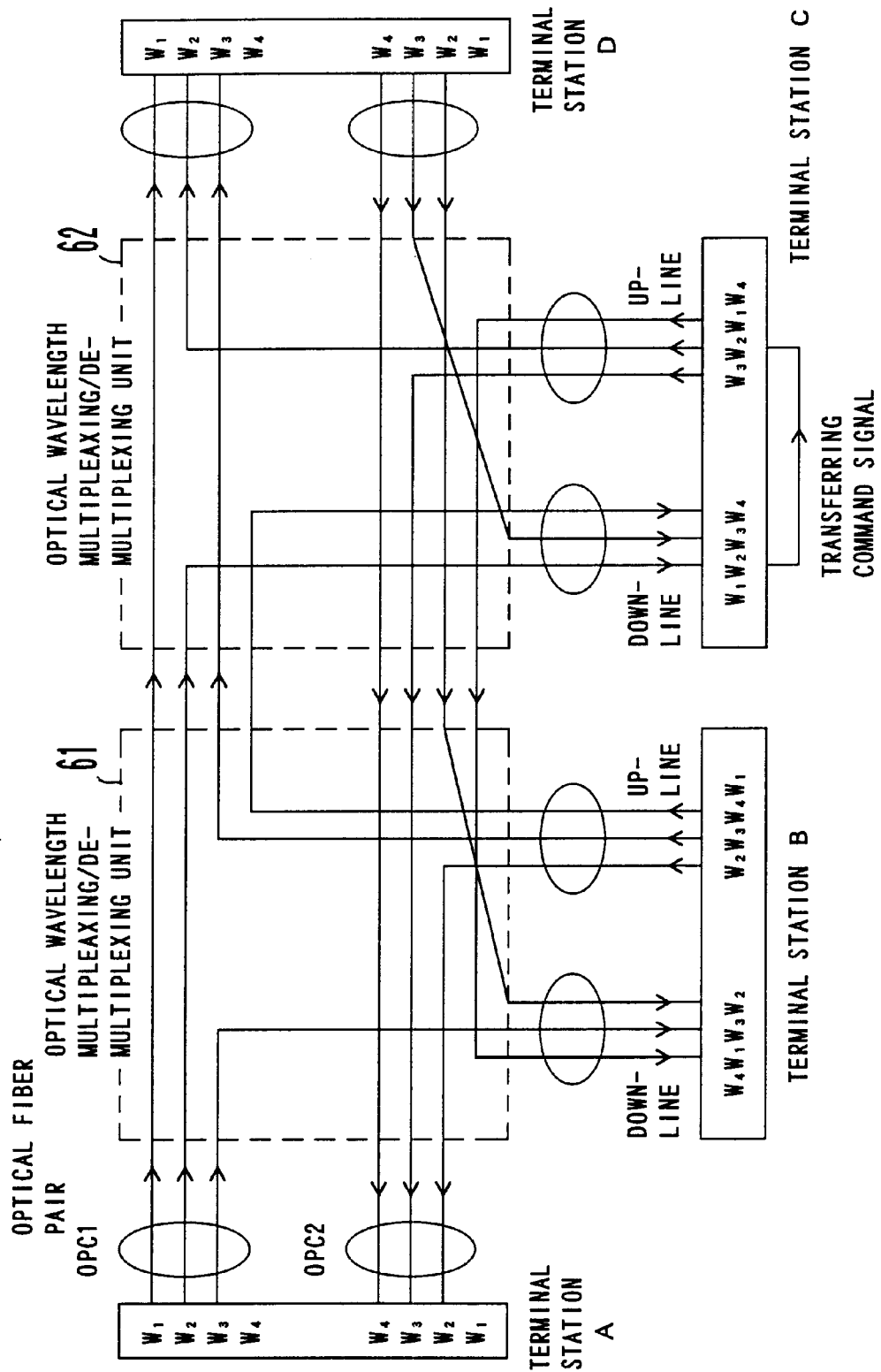
F I G. 15

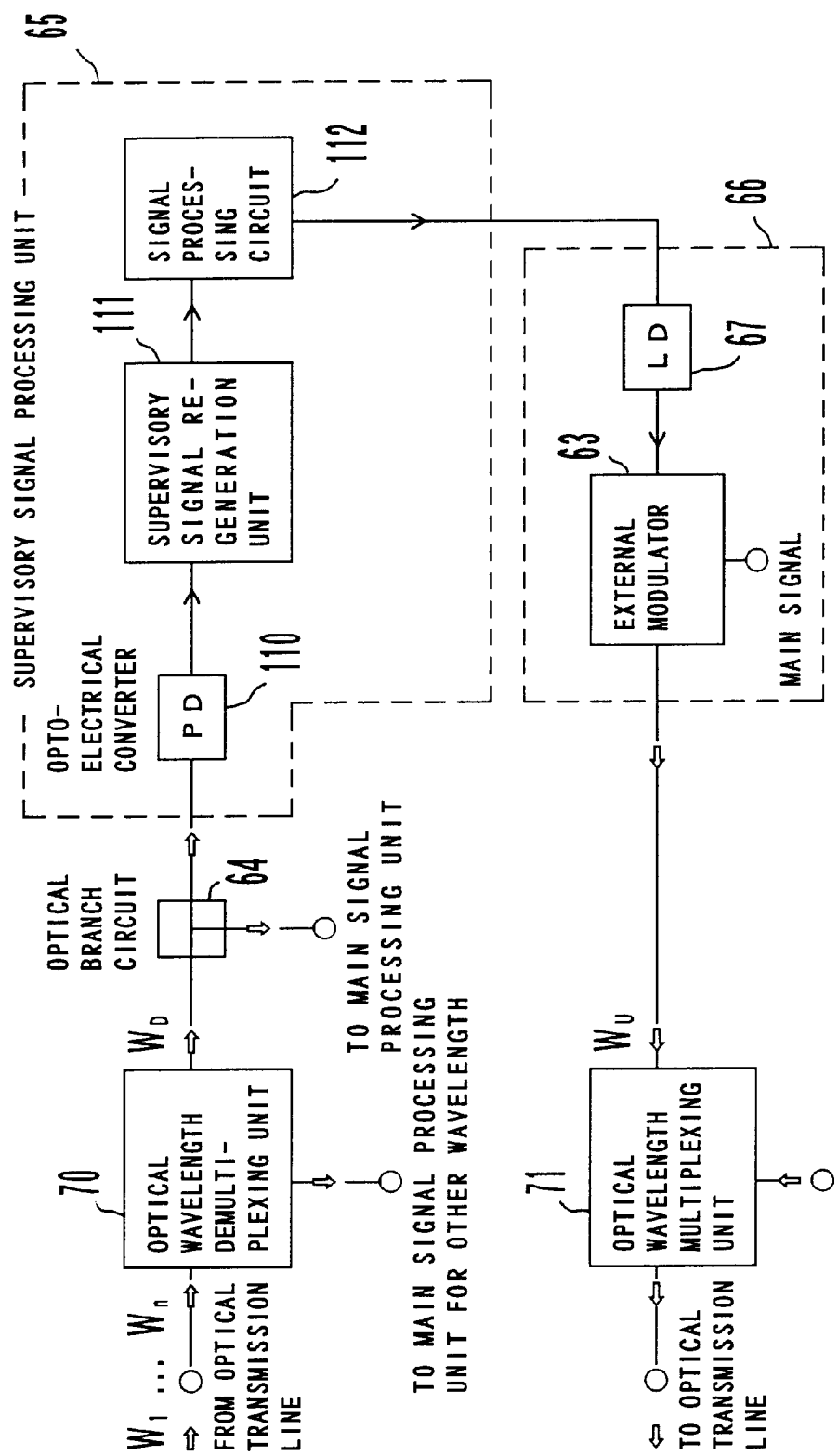
FIG. 16

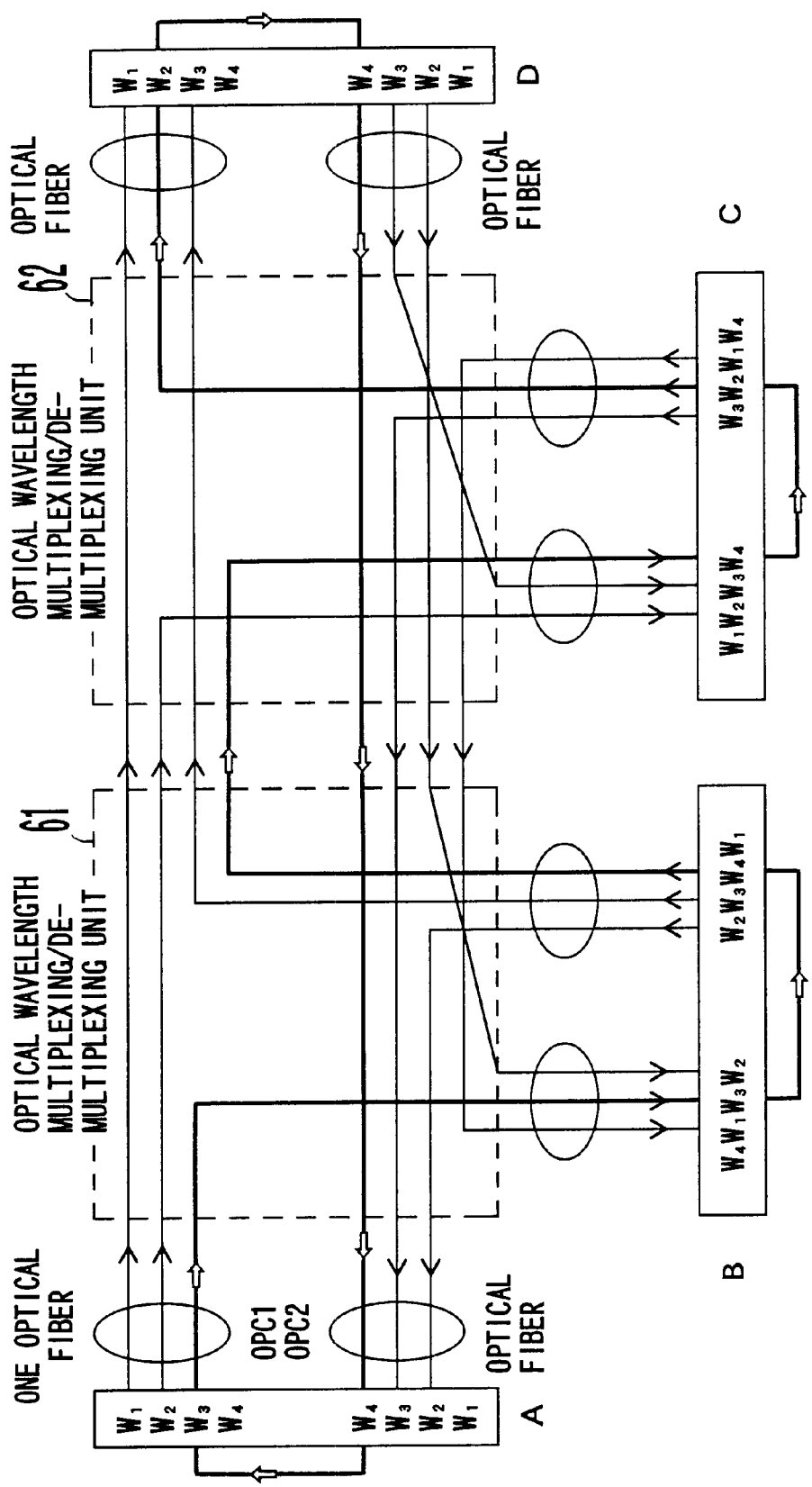
F I G. 17
— INDICATES A PATH THROUGH WHICH SUPERVISORY SIGNAL PASSES

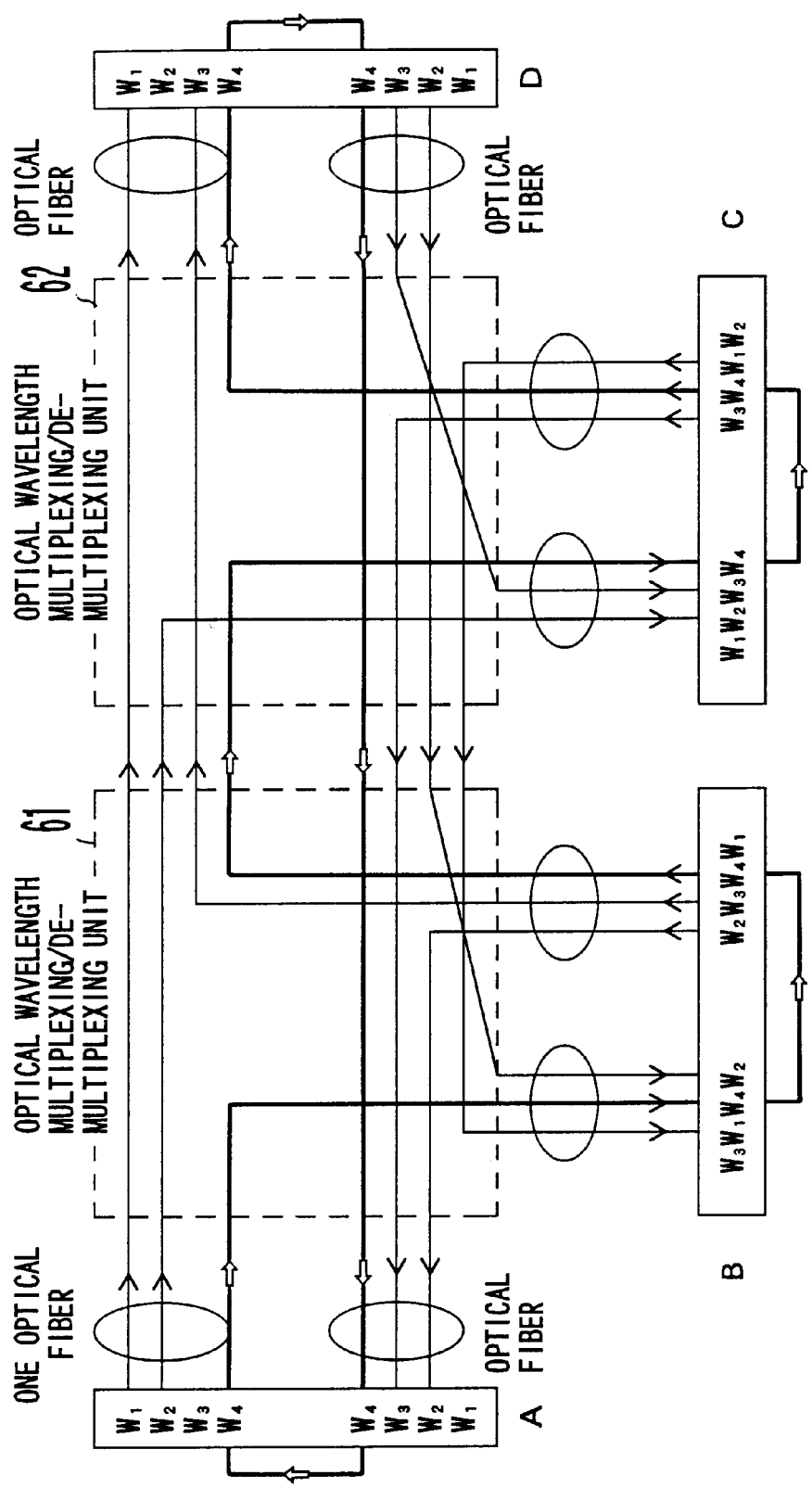
F I G. 18

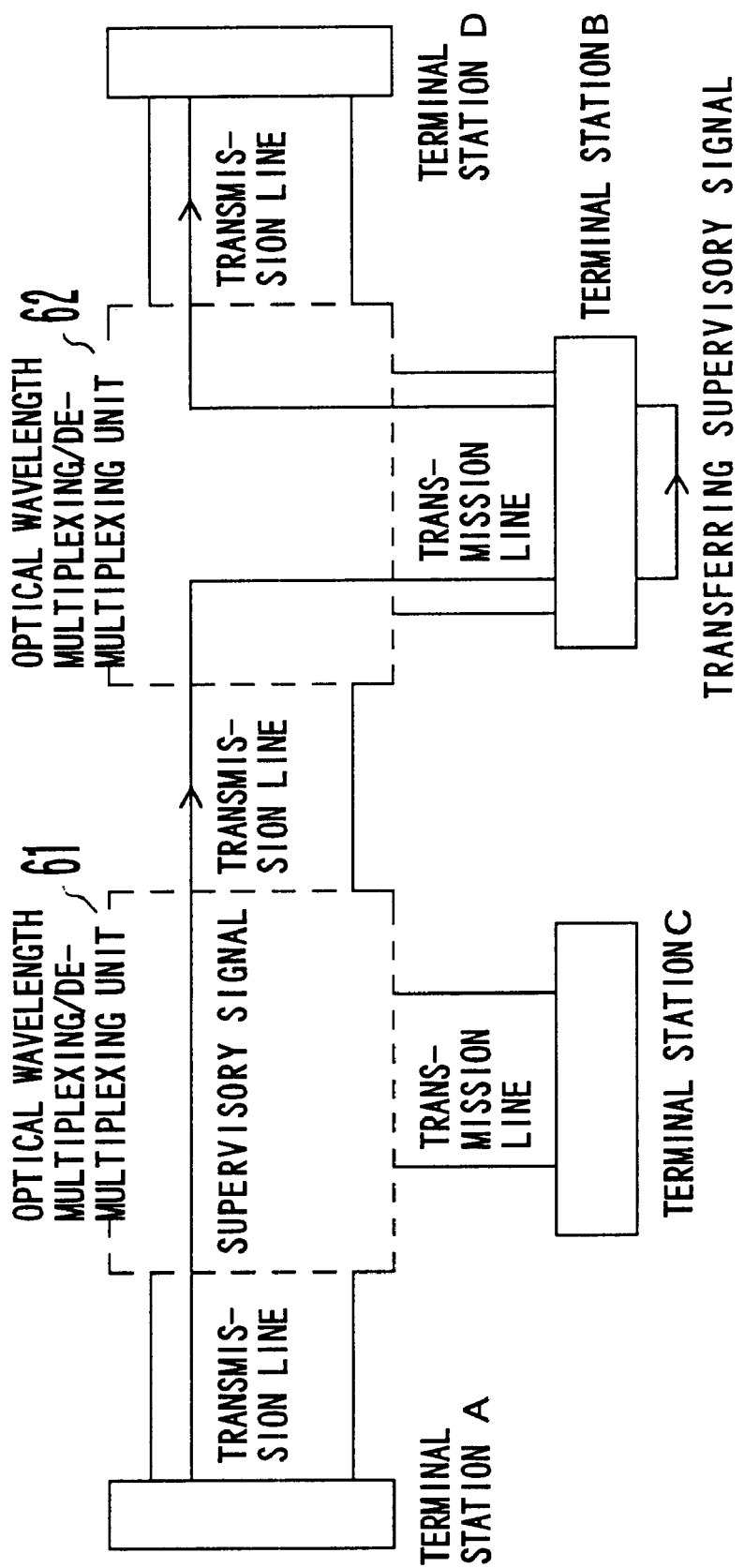
FIG. 19

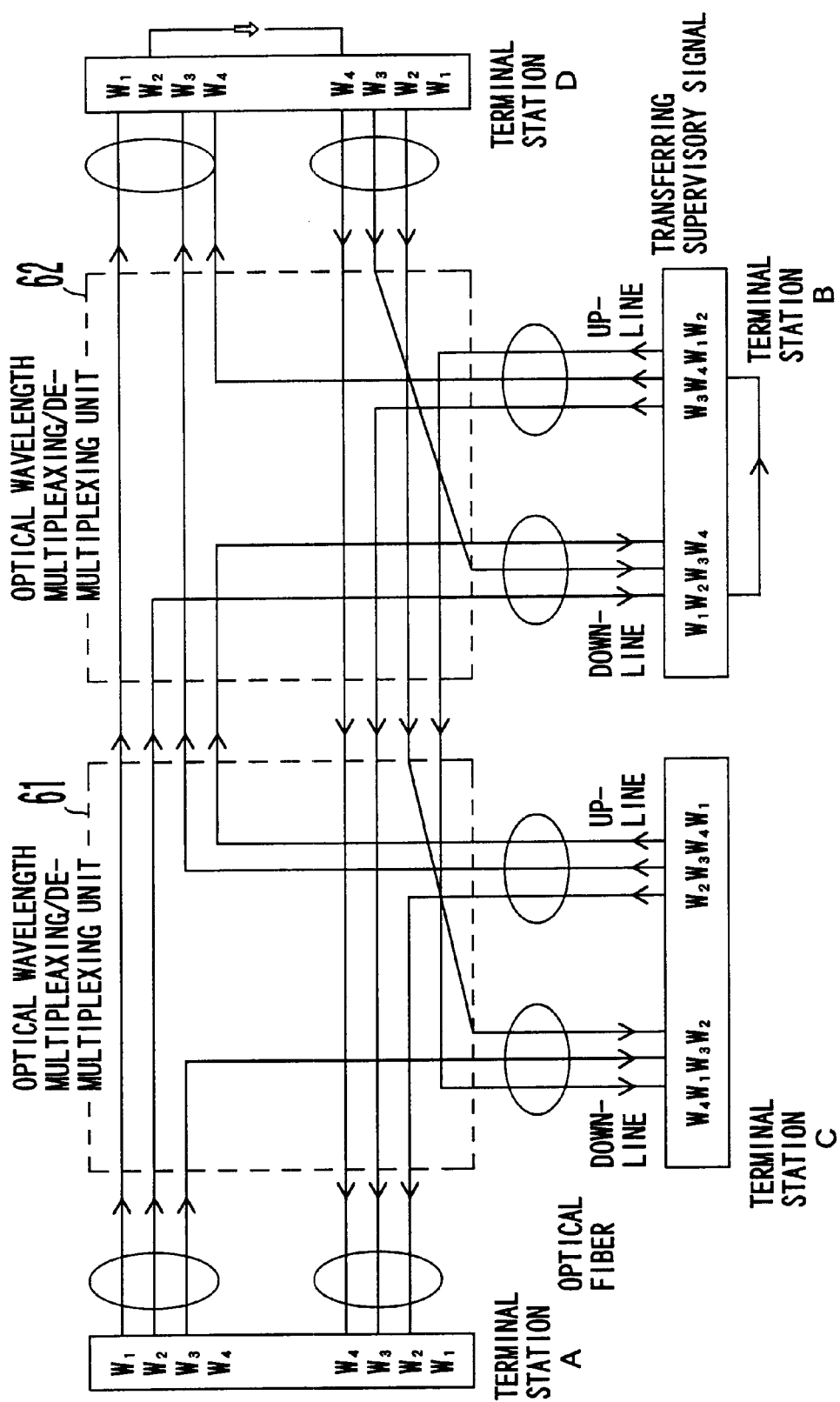
FIG. 20

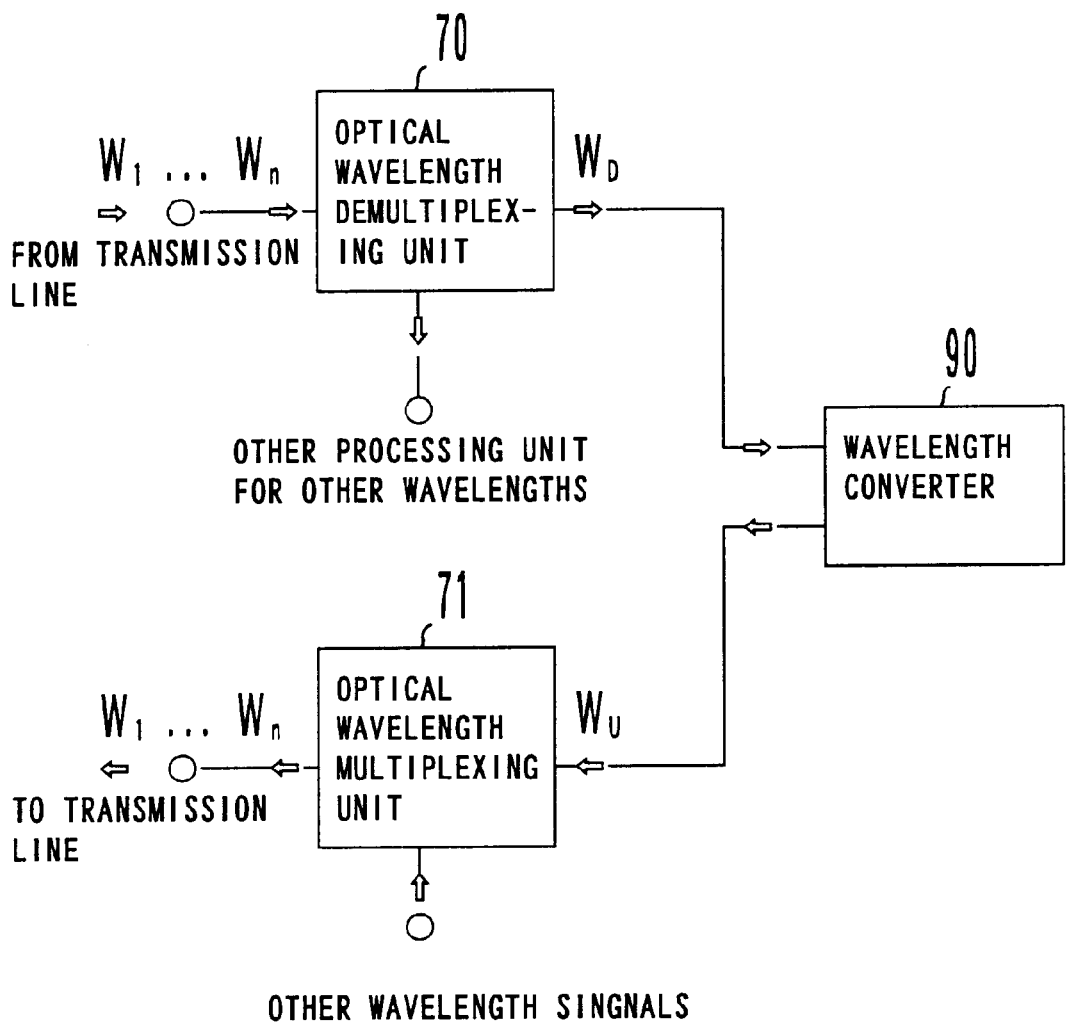
F I G. 2 1

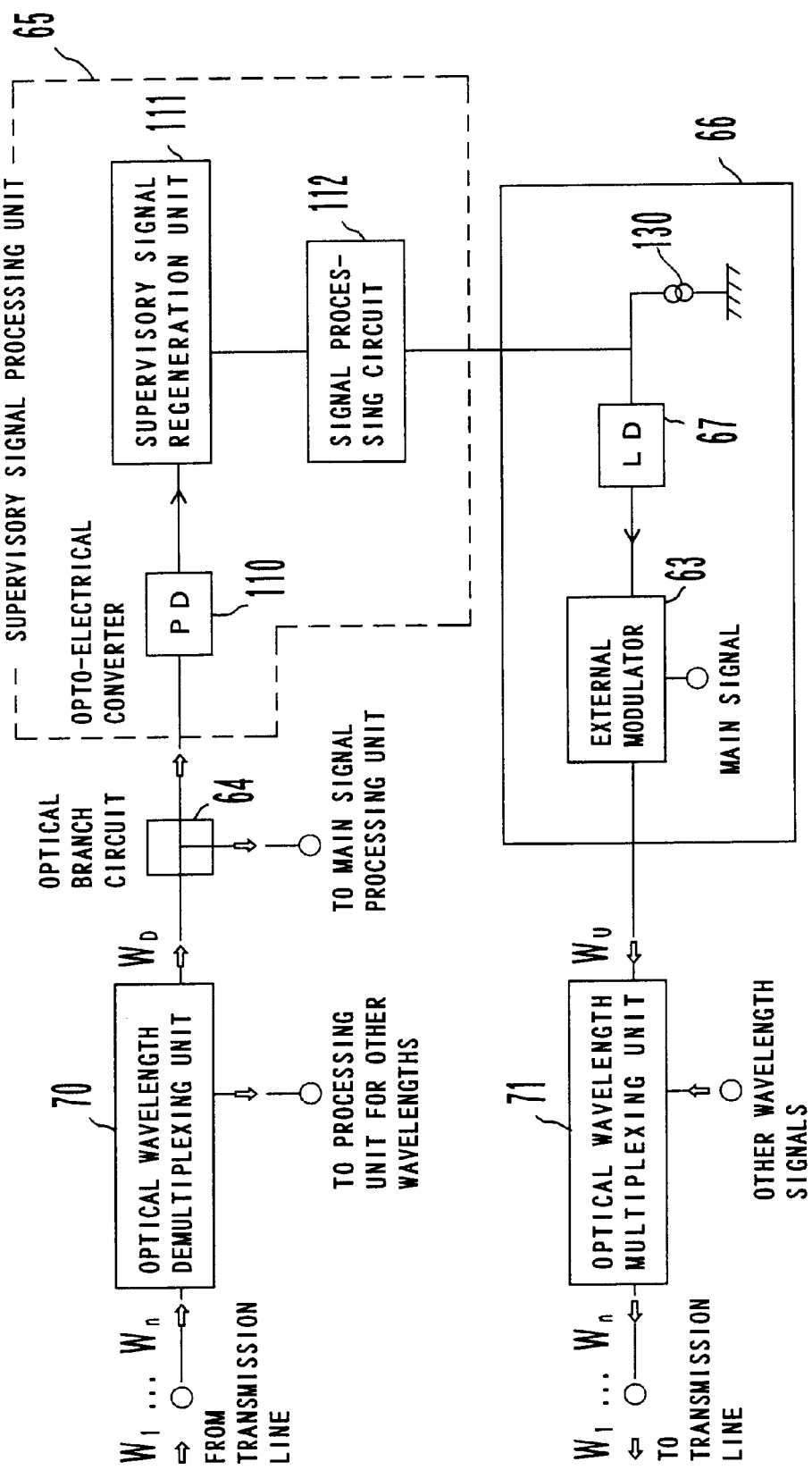
FIG. 22

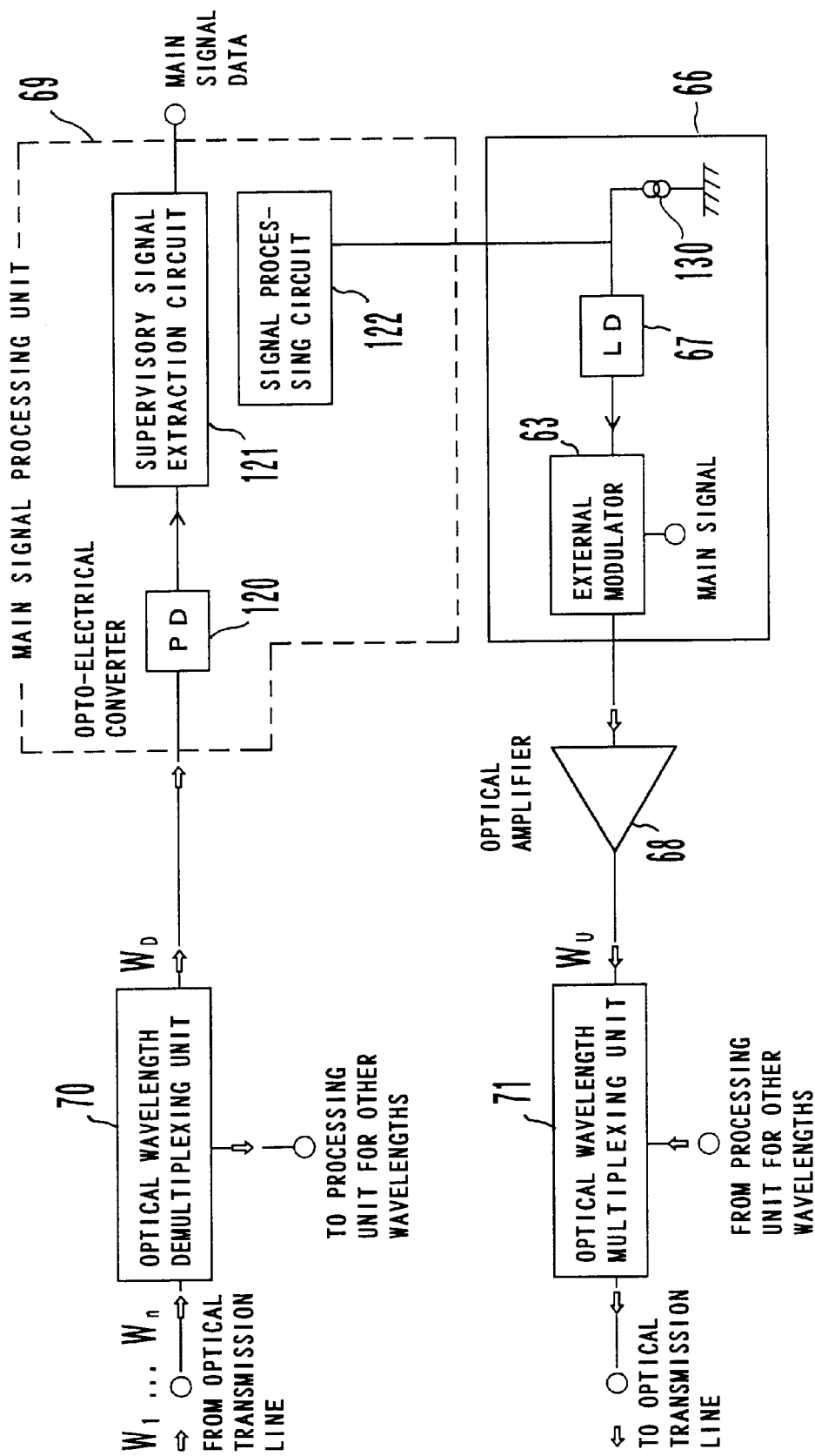
FIG. 23

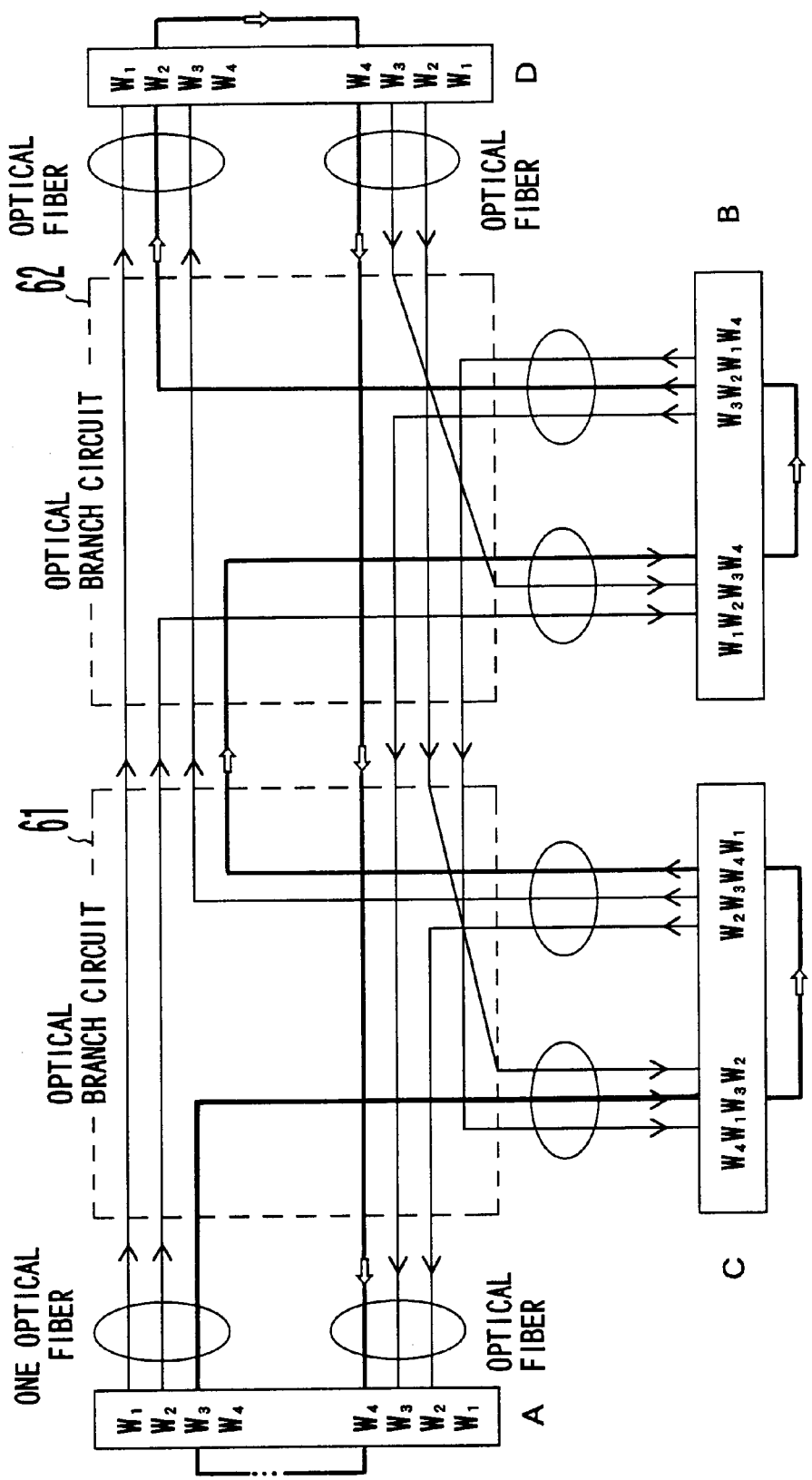
FIG. 24
— INDICATES A PATH THROUGH WHICH SUPERVISORY SIGNAL PASSES

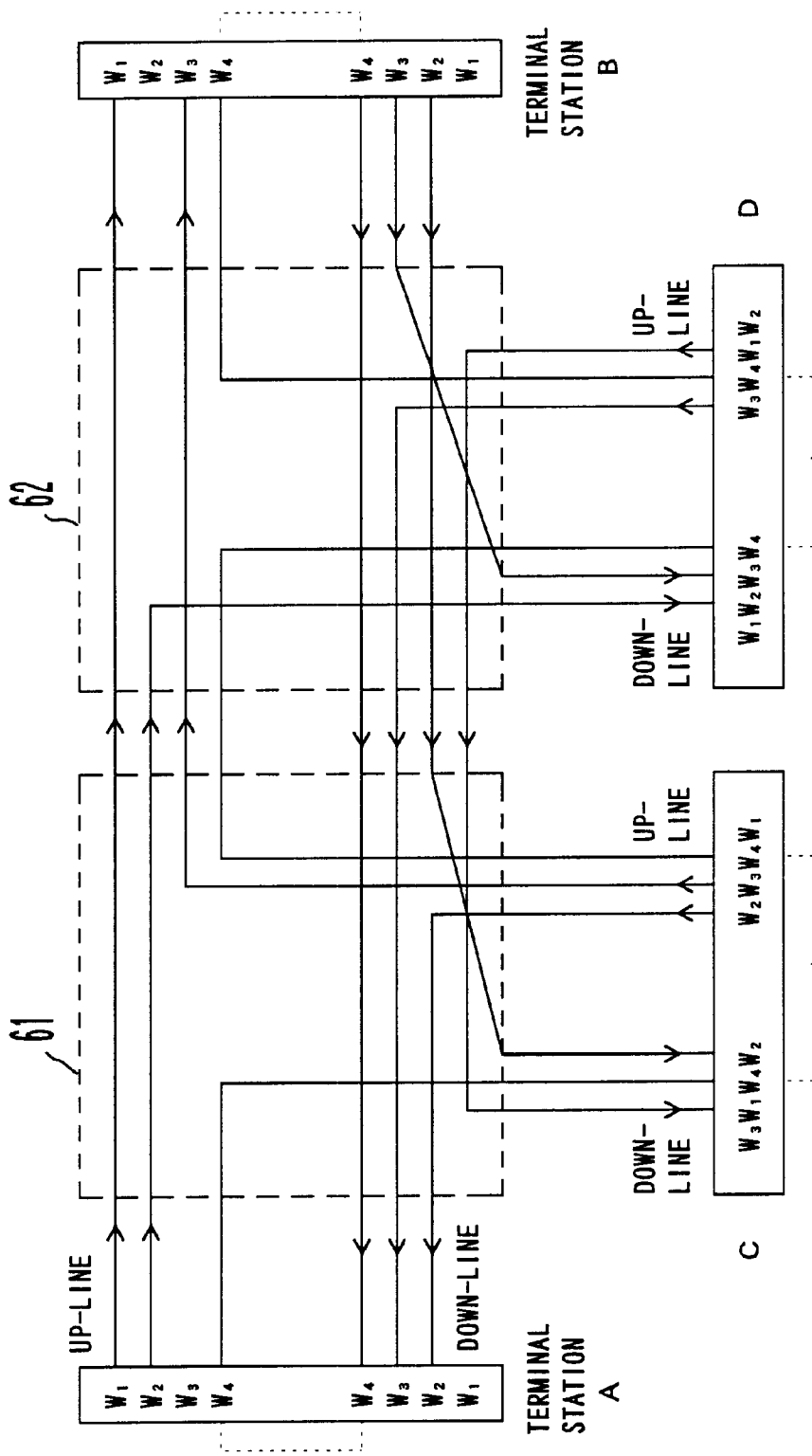
FIG. 25
— INDICATES A PATH THROUGH WHICH SUPERVISORY SIGNAL PASSES

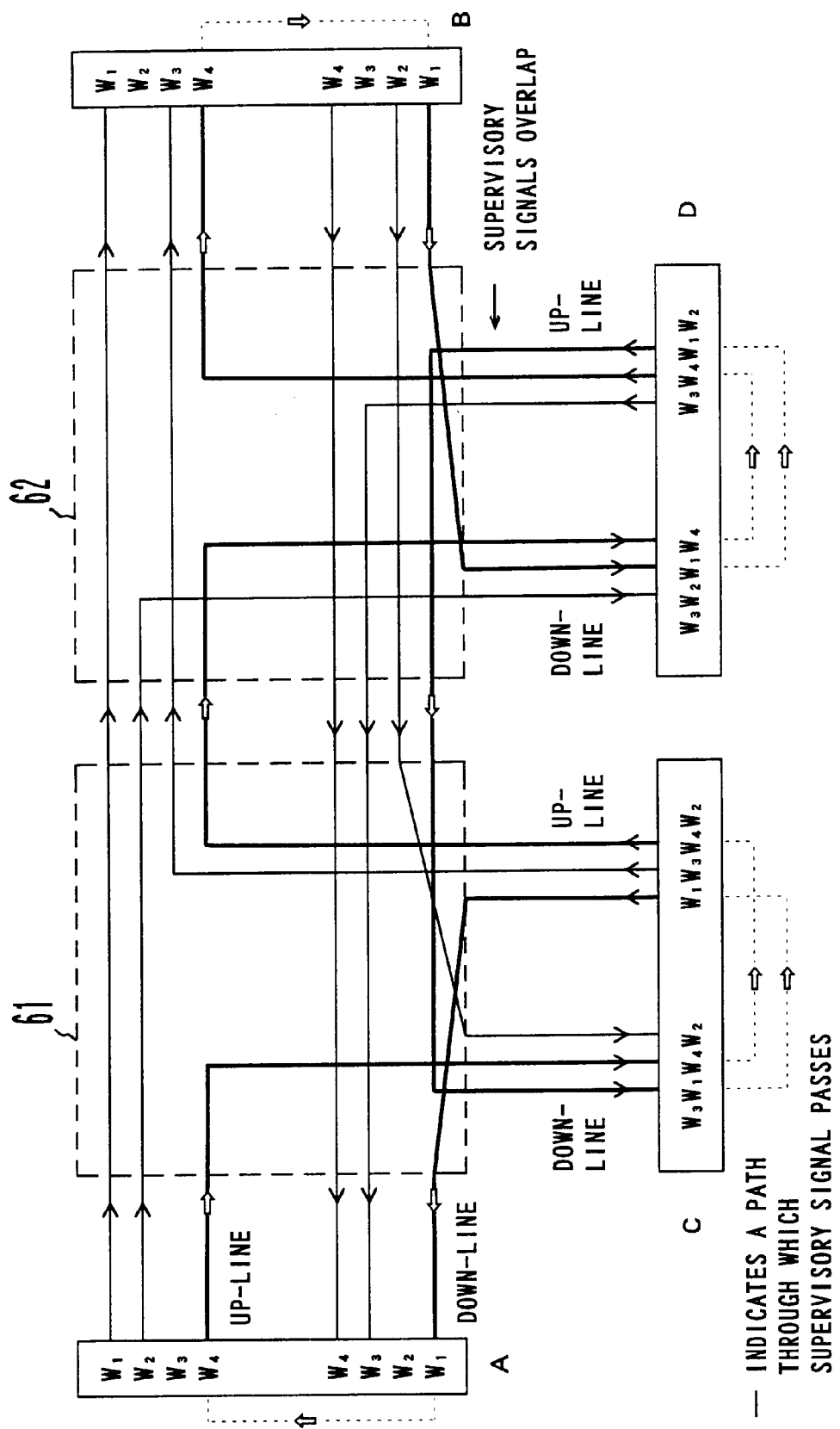
FIG. 26

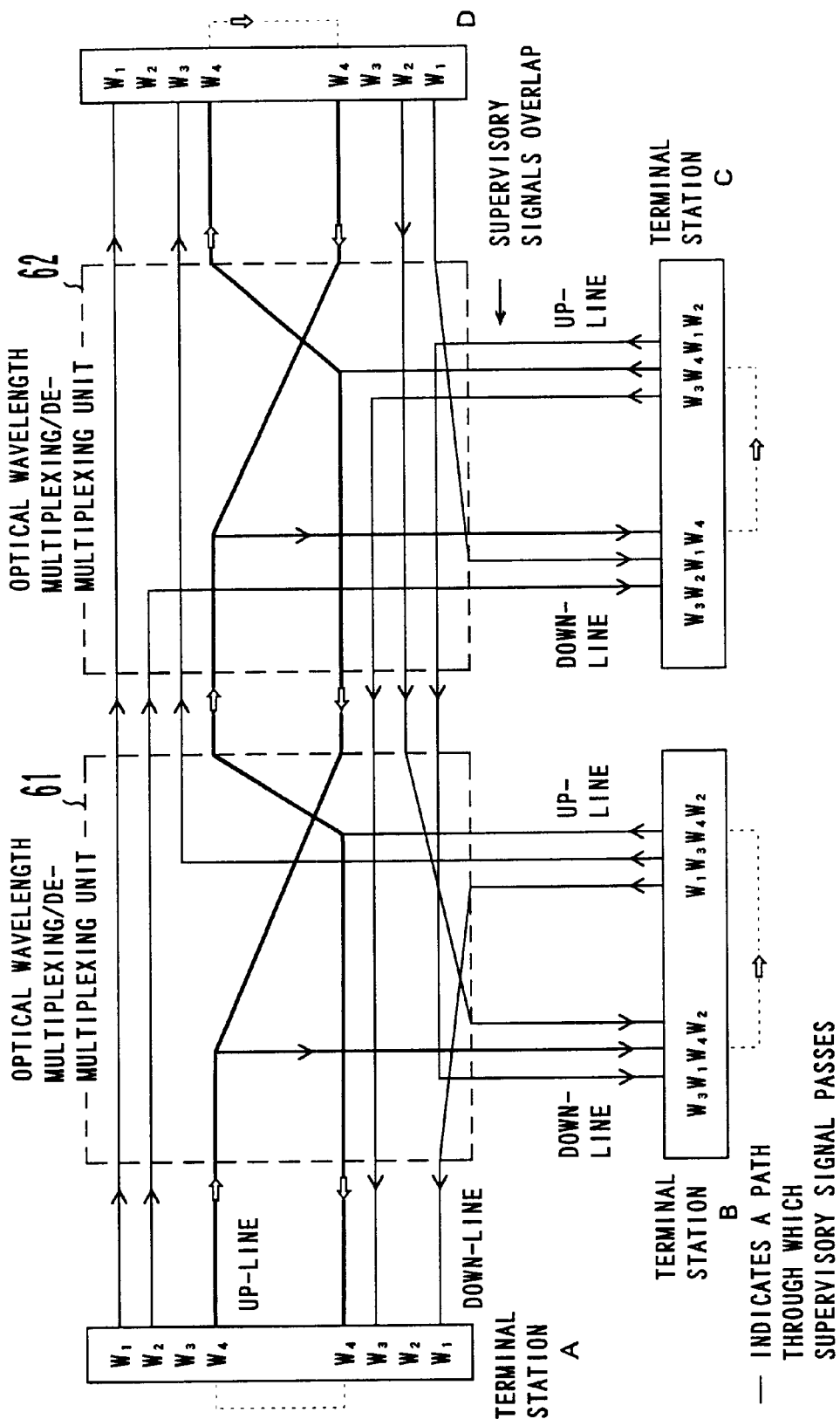
FIG. 27

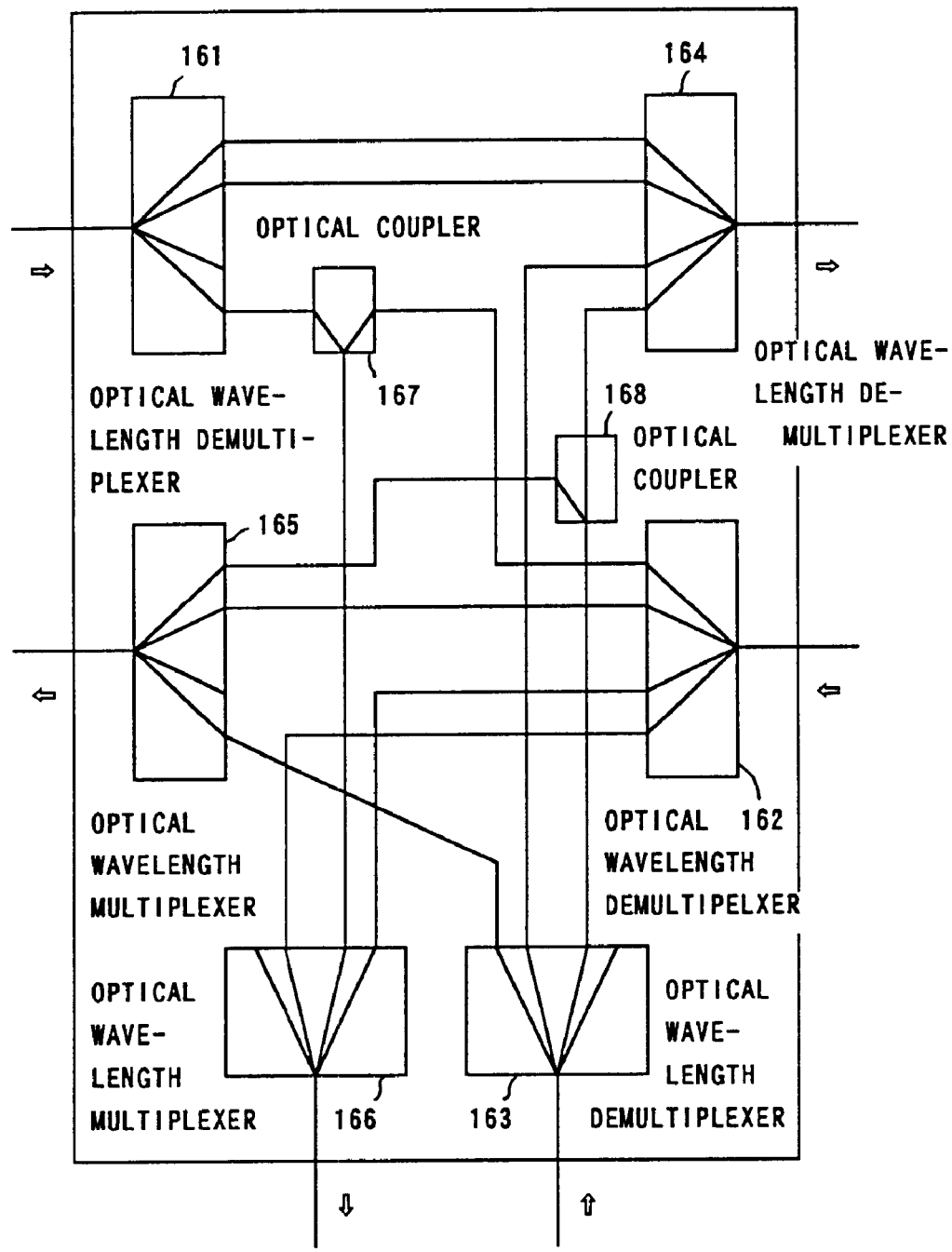
FIG. 28

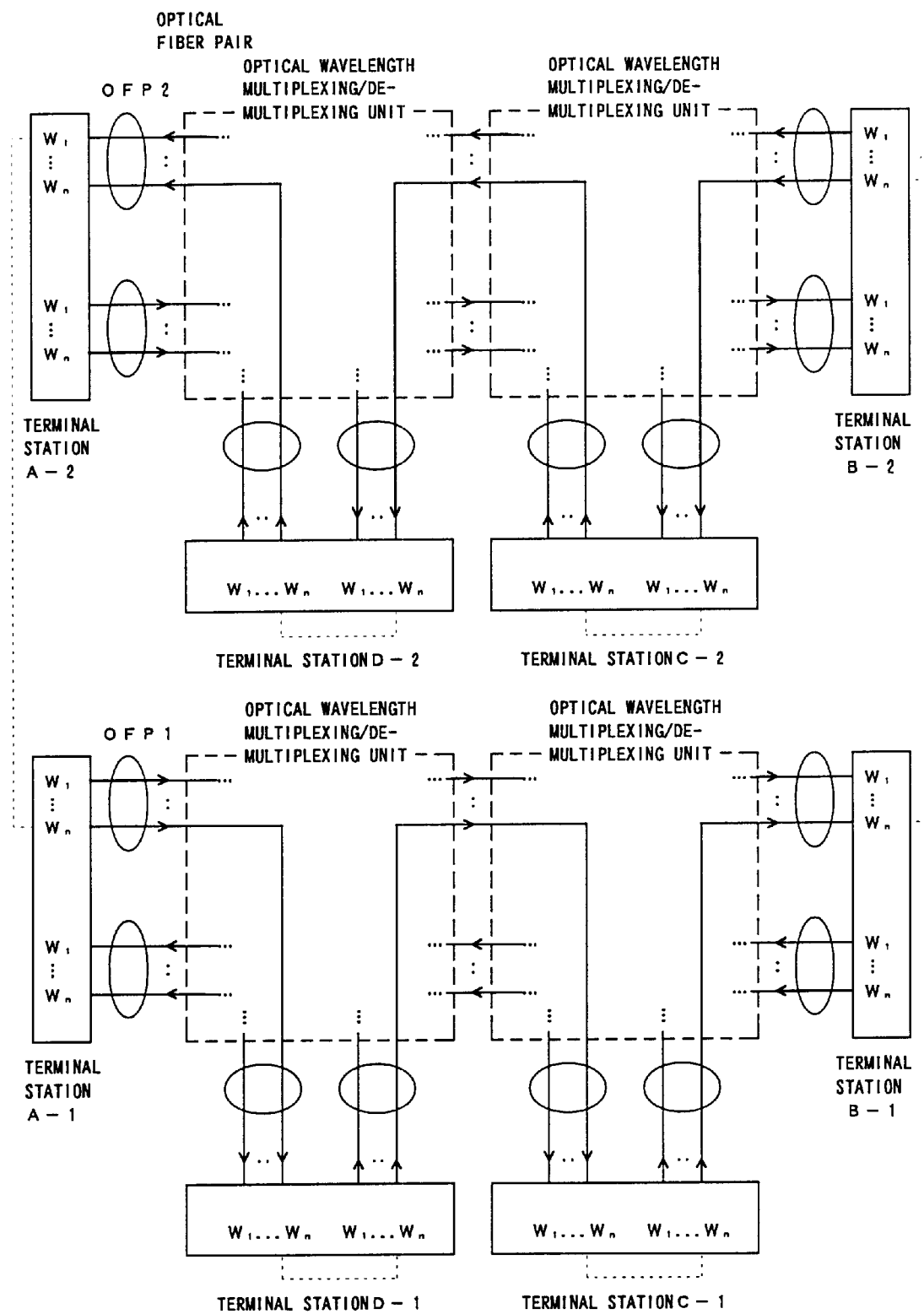
FIG. 29

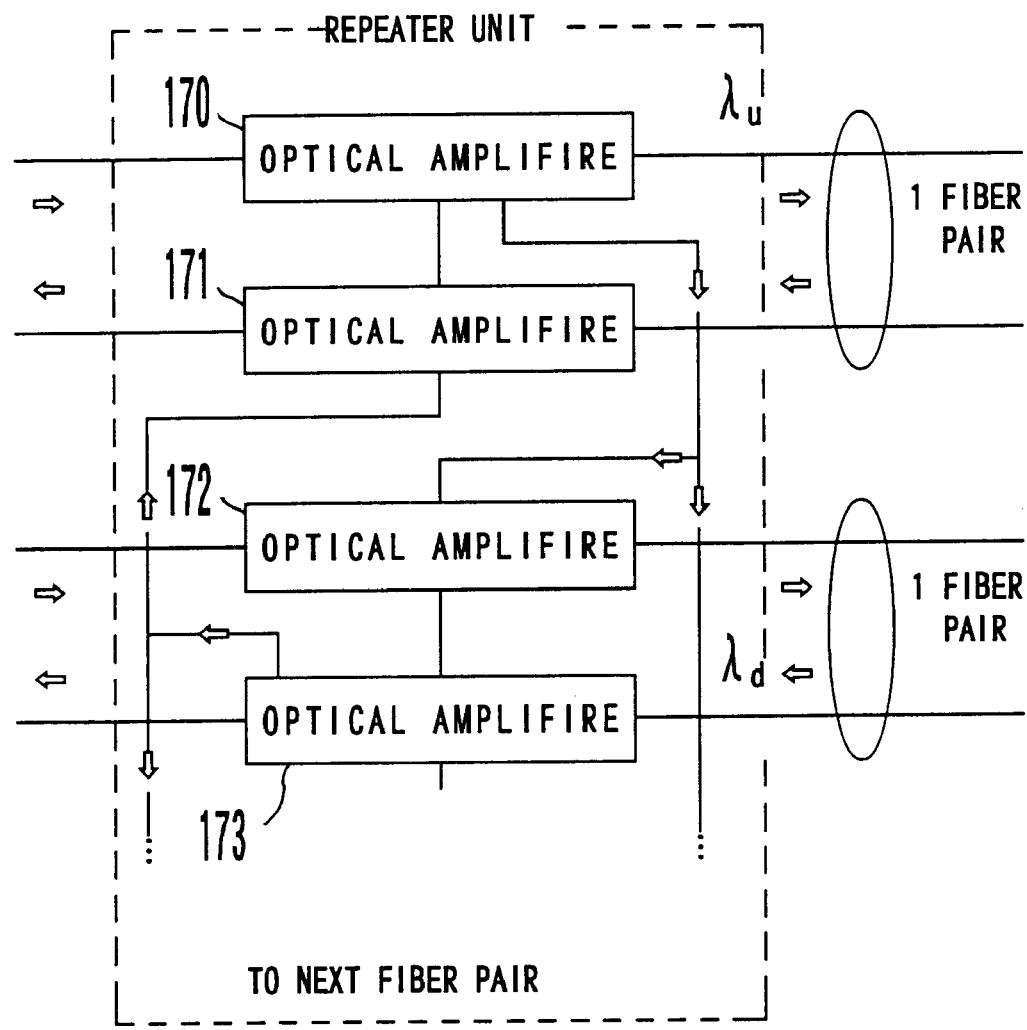
F I G. 3 0

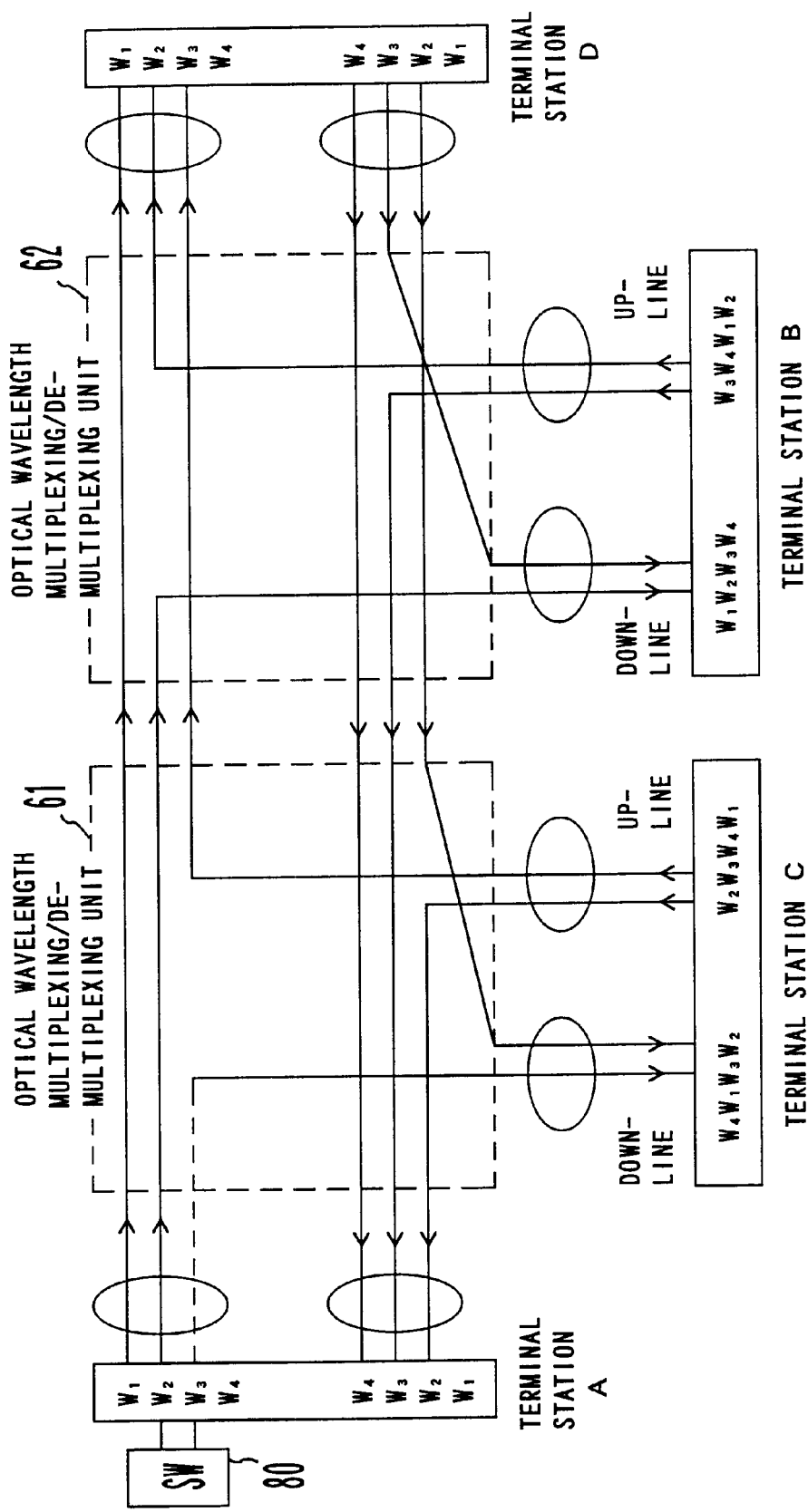
FIG. 31

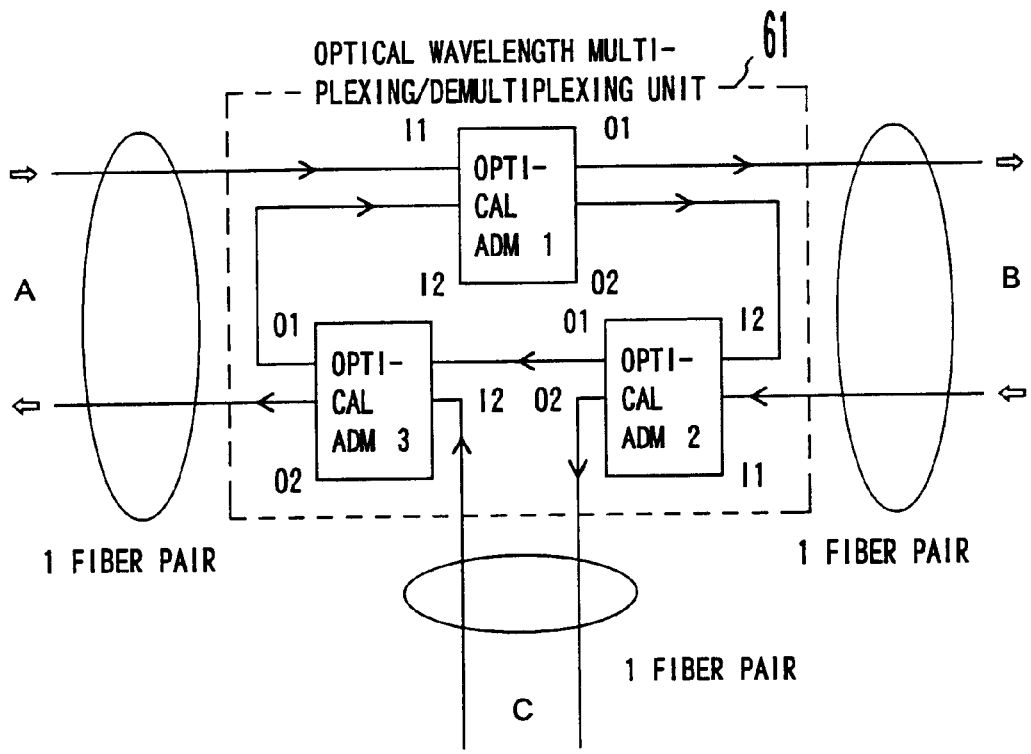
FIG. 32A
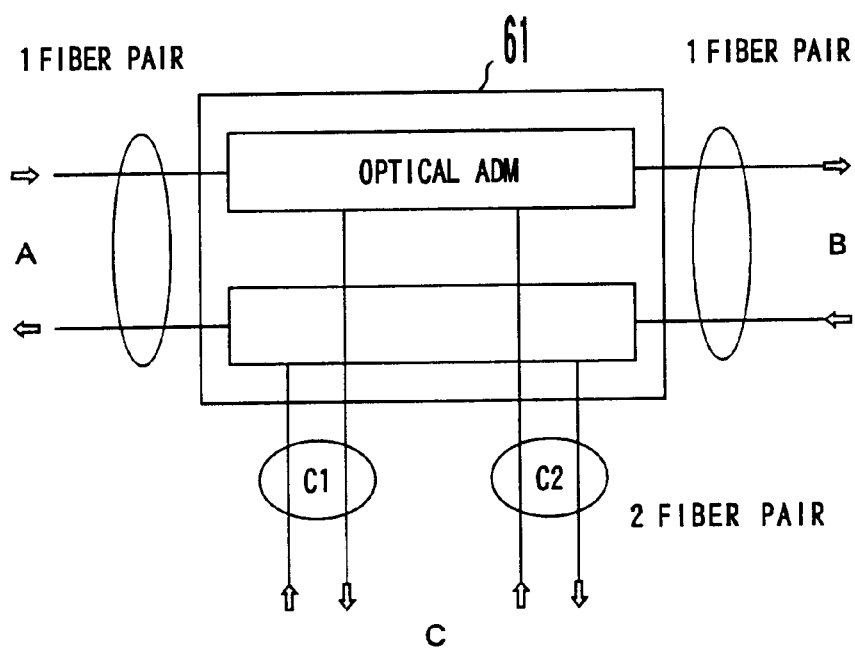
FIG. 32B

WAVELENGTH DIVISION MULTIPLEXING COMMUNICATIONS NETWORK SUPERVISORY SYSTEM

BACKGROUND OF THE INVENTION

1. Field of the Invention

The present invention relates to a supervisory system for monitoring an optical amplification repeater unit in an optical communications network to which wavelength division multiplexing (WDM) technology is applied.

2. Description of the Related Art

Recently, an optical communications network operated using the wavelength division multiplexing technology (WDM) has been frequently taken up in many studies and developments. In the optical communications network, a large capacity data transmission can be realized using a wavelength-multiplexed optical signal.

On the other hand, a fault in an optical amplification repeater unit is a serious problem in the optical communications network. Therefore, an optical transmission system using the optical amplification repeater unit requires a unit for monitoring the state of the optical amplification repeater unit.

A state of the optical amplification repeater unit to be monitored refers to an optical input/output power, an exciting power, the temperature of an exciting laser diode (LD), a bias current of the exciting LD, etc.

A conventional optical transmission system has a point-to-point type transmission line in which a terminal station A is connected to another terminal station B one to one through a plurality of optical repeater amplifiers REP 1 through REP 4 as a point-to-point type transmission line as shown in FIG. 1. The system normally includes at least one optical wavelength multiplexing/demultiplexing unit; a plurality of terminal stations connected to at least one optical wavelength multiplexing/demultiplexing unit through an optical transmission line; and a plurality of optical repeater units positioned in the optical transmission line, wherein the second terminal station receives a supervisory signal (SV signal) transmitted from the first terminal station of the plurality of terminal stations to the optical repeater unit through the optical wavelength multiplexing/demultiplexing unit, and the received supervisory signal is transferred to the third terminal station through the optical wavelength multiplexing/demultiplexing unit. Otherwise, the system includes at lease one optical wavelength multiplexing/demultiplexing unit; a plurality of terminal stations connected to at least one optical wavelength multiplexing/demultiplexing unit through an optical transmission line; and a plurality of optical repeater units positioned in the optical transmission line, wherein the second terminal station receives a supervisory signal (SV signal) transmitted from the first terminal station of the plurality of terminal stations to the optical repeater unit through the optical wavelength multiplexing/demultiplexing unit; the received supervisory signal is transferred to the third terminal station through the optical wavelength multiplexing/demultiplexing unit.

In such a supervisory system in the above described optical transmission system, a supervisory signal (a command signal to an optical amplification repeater unit) is transmitted from the terminal station A to the optical amplification repeater unit REP 1. In such a conventional 1-channel communications (1-wave transmission), the optical amplification repeater unit REP 1 which receives the supervisory signal performs control corresponding to the received supervisory signal, and transmits a response signal containing the state information of the optical amplification repeater unit to the adjacent optical amplification repeater unit REP 2 for the supervisory signal to be sent to the terminal station B. Thus, the supervisory signals are sequentially transmitted.

A system for transmitting a supervisory signal and a response signal to an optical amplification repeater unit can be a superposing system for superposing the supervisory signal (command signal for controlling the optical amplification repeater unit) into a data signal (main signal) to be transmitted, or a wavelength division multiplexing system for wavelength-multiplexing the supervisory signal having a wavelength different from that of the main signal.

FIGS. 2A through 2C show an example of the operation of the optical amplification repeater unit in the superposing system. As shown in FIG. 2A, for example, the main signal M of 2.5 through 20 Gb/s is modulated by a supervisory signal SV of 1 through several tens MHz to generate a superposing signal, and transmitted to the optical fiber transmission line OP.

The optical amplification repeater unit branches an optical signal obtained by modulating the intensity of the main signal M using the supervisory signal SV, by the branch unit BR as shown in FIG. 2B. The branched optical signal is converted into an electrical signal by the optical receiving element PD such as a photo-diode, etc.

Only the supervisory signal SV is extracted through the filter FIL from among the electrical signals converted by an optical receiving element PD, and led to the control circuit CONT. The control circuit CONT controls an optical amplification repeater unit according to the extracted supervisory signal SV, and outputs a response signal SV' having a predetermined frequency corresponding to the state of the optical amplification repeater unit. This response signal SV' drives an exciting laser diode LD.

The gain of the optical fiber amplifier AMP is proportional to an exciting power. Therefore, the exciting power proportional to the response signal SV' is output from the exciting laser diode LD, and the intensity of the optical signal input to the optical fiber amplifier AMP is modulated in proportion to the response signal SV'. Through this operation, the response signal SV' from the optical amplification repeater unit can be superposed on the main signal M input as shown in FIG. 2C, and transmitted to the next optical amplification repeater unit from the optical amplification repeater.

On the other hand, various developments have recently been made to realize wavelength division multiplexing communications, and it is considered that the wavelength division multiplexing system (WDM system) will also be adopted in the future optical communications network. In WDM transmission, a plurality of channels can be transmitted through a single fiber. Therefore, a plurality of terminal stations can be connected by demultiplexing and multiplexing an optical signal.

In 1-wave transmission, an amplitude modulating method is used when an SV signal is transmitted. However, in the WDM transmission in which a plurality of terminal stations are connected, it becomes difficult to perform supervisory operation in the above described method on the following grounds.

(1) The modulation rate of the SV signal becomes smaller because of a lack of channels of a main signal produced by multiplexing/demultiplexing the main signal on which the SV signal is amplitude-modulated, thereby disabling the reception at a repeater unit.

(2) In multiple-repeater transmission, accumulated noise lights make the ratio of the power of a signal light to the entire optical power smaller. As a result, the modulation rate of the SV signal superposed on the signal light naturally becomes smaller.

(3) The propagation time of a signal light depends on the wavelength through the wavelength dispersion of a fiber. Therefore, the SV signal superposed on each signal light deviates in phase, thereby lowering the modulation rate.

(4) If the modulation rate in transmission from a terminal station is set to a high level in consideration of the modulation rate lowered in (1), (2), and (3) above, then the modulation of the SV signal affects the main signal.

FIGS. 3A and 3B show an example of an operation performed by the optical amplification repeater unit in the system in which the supervisory signal SV having a different wavelength from that of the main signal M is wavelength-multiplexed. FIG. 3A shows an optical spectrum and shows that the supervisory signal SV having a different wavelength from that of the main signal M is wavelength-multiplexed.

As shown in FIG. 3B, the wavelength-multiplexed light signal is input and branched by the branch unit BR, and the supervisory signal SV is extracted through the filter FIL. The extracted supervisory signal SV is led to a supervisory signal receiving circuit SVREC, opto-electrically converted, and demodulated.

Then, as with the example shown in FIGS. 2A through 2C, the optical amplification repeater unit is controlled according to the demodulated supervisory signal SV, and a response signal SV' at a predetermined frequency corresponding to the state of the optical amplification repeater unit is output. The exciting laser diode LD is driven according to the response signal SV'.

The exciting power proportional to the response signal SV' is output from the exciting laser diode LD, and intensity of the input optical signal of the optical fiber amplifier AMP is modulated in proportion to the response signal SV'. In this operation, the response signal SV' can be transmitted from the optical amplification repeater unit together with the main signal M and the supervisory signal SV to the next optical amplification repeater unit.

FIG. 4A shows an example of the optical transmission system (WDM network system) which is a network system in the wavelength division multiplexing (WDM) technology. The transmission lines comprise at least a pair of optical fiber pair cable OPC as an up-line and a down-line for communications whose loss can be compensated by providing a plurality of optical amplification repeater units REP.

Each of the plurality of optical amplification repeater units REP is provided with optical amplifiers FF and FR. Furthermore, with the configuration shown in FIG. 4A, the optical wavelength multiplexing/demultiplexing unit OSEP is provided between the terminal stations A and D, and the terminal stations B and C for branching and inserting a signal are connected to the unit. A plurality of signal lights having different wavelengths are wavelength-multiplexed and transmitted as WDM signals from each of the terminal stations A, B, C, and D to a single optical fiber.

The WDM signal is transmitted from, for example, the terminal station A, distributed by the optical wavelength multiplexing/demultiplexing unit OSEP to its output path for each wavelength, and transmitted to the corresponding receiving terminal station B, C, or D.

FIG. 4B shows the concept of the path for an OTDR (Optical Time Domain Refrectometer).

The OTDR method is used to check the damage of an optical fiber and the state of the optical loss. In the OTDR method, an optical signal is transmitted from one optical fiber, and this optical signal propagated through the other optical fiber should be received. To attain this, an OTDR path is prepared to connect the up-line to the down-line at the optical amplifier provided in the repeater unit. This path is designed to simply connect the up-line to the down-line by branching an optical fiber. When the characteristic of the optical fiber is checked in the OTDR method, the output of a main signal and other signals are stopped to perform the check in the OTDR method. Then, the optical signal transmitted from the up-line is returned by each repeater unit to the source terminal station through the down-line. The optical fiber can be checked by detecting the returned optical signal.

FIG. 5 shows an example of a ring-shaped network. In this example, as in FIG. 4A, the transmission lines comprise at least a pair of optical fiber pair cable OPC as an up-line and a down-line for communications whose loss can be compensated by providing a plurality of optical amplification repeater units REP. A WDM signal is distributed by the optical wavelength multiplexing/demultiplexing unit OSEP to its output path for each wavelength, and transmitted to a corresponding receiving terminal station.

The above described WDM networks shown in FIGS. 4A and 5 have the following characteristics. A plurality of signal lights (WDM signals) having different wavelengths are passed through a single fiber. The optical wavelength multiplexing/demultiplexing unit OSEP multiplexes/demultiplexes a main signal (WDM signal) in the transmission line. A plurality of terminal stations exist in a system, and a plurality of communications paths (optical paths) connects the stations.

However, when the system of transmitting/receiving a supervisory signal as described above by referring to FIGS. 2A through 2C, 3A, and 3B is applied to the system shown in FIGS. 4A and 5, the following problems arise.

A. Problem Arising when the Superposing System is Applied to the WDM Network

Even if a supervisory signal is superposed on a signal light having a specific wavelength, the signal light may not pass through all transmission lines. Therefore, a supervisory signal cannot be transmitted from a terminal station to all optical amplification repeater units in the network.

For example, in FIG. 6 shown correspondingly to FIG. 4A, only one of the up-line and the down-line is shown, but the transmission line of a supervisory signal can transmit the supervisory signal only to the optical amplification repeater unit REP provided between the terminal stations A and C even if the supervisory signal is superposed and then transmitted from the terminal station A by the wavelength $W_3$.

Since the electric power of the signal light having a wavelength different from that of the signal light modulated according to the supervisory signal is strong, the ratio of the electric power of the supervisory signal in the electric power of all signal lights is reduced, and the receiving electric power becomes lower than in the single-wave transmission.

B. Problem Arising when the Wavelength Multiplexing/demultiplexing System is Applied When the communications path designed for transmitting a main signal is used as a communications path for exclusively transmitting a supervisory signal, a problem similar to the above described problem A arises. When a communications path is designed to connect a terminal station to all repeater units exclusively for supervisory control, signal lights having plural wavelengths are required.

For example, in the example shown in FIG. 7, as in FIG. 6, only one of the up-line and the down-line is shown. When a supervisory signal is transmitted from the terminal station A to all repeater units REP between the terminal stations A and B, A and C, and A and D, at least three wavelengths $W_1$ through $W_3$ are required. On the other hand, a method of branching a light of a supervisory signal can be adopted as shown in FIG. 8, but, in this case, the number of wavelengths should be equal to the number of terminal stations. Therefore, there is the problem that a transmission band cannot be effectively utilized.

Furthermore, only the light of a supervisory signal can be extracted using an optical filter in the supervisory signal receiving unit in the repeater unit to improve the electric power for receiving the supervisory signal in the repeater unit. However, when a plurality of wavelengths are modulated by the supervisory signal as described above, this method cannot be applied.

SUMMARY OF THE INVENTION

The problem similar to the above described problem A may arise when the wavelength division multiplexing system is used. Therefore, the present invention aims at providing a supervisory system in a wavelength division multiplexing network satisfying the following conditions.

That is, (1) The electric power for receiving a supervisory signal in the repeater unit is large, that is, the repeater unit can easily receive a supervisory signal; (2) There are no influences on a main signal; (3) An optional repeater unit can be monitored from a terminal station, and the signal transmission band can be effectively used.

A further object of the present invention is to provide an optical transmission system capable of transmitting a supervisory signal to all repeater units along a small number of channels in the WDM transmission, and checking an optical fiber in the OTDR method using a channel exclusive for a supervisory signal.

The first configuration of the supervisory system in the wavelength division multiplexing communications network according to the present invention that solves the above described problems includes at least one optical wavelength multiplexing/demultiplexing unit, a plurality of terminal stations connected to at least one optical wavelength multiplexing/demultiplexing unit through an optical transmission line, and a plurality of optical repeater units provided in the optical transmission line. With the configuration, a supervisory signal for the optical repeater unit transmitted from the first terminal station of the plurality of terminal stations is received through the optical wavelength multiplexing/demultiplexing unit by the second terminal station, and the received supervisory signal is transferred to the third terminal station through the optical wavelength multiplexing/demultiplexing unit.

The second configuration of the supervisory system in the wavelength division multiplexing communications network according to the present invention is similar to the first configuration wherein the first terminal station transmits the supervisory signal to the second terminal station through the communications line assigned to main signal data. The second terminal station receives the supervisory signal, modulates the signal light having at least one wavelength according to the supervisory signal, multiplexes the modulated signal light having at least one wavelength with another signal light, and transfers it to the third terminal station through the communications line assigned to the main signal data.

Furthermore, the third configuration of the supervisory system in the wavelength division multiplexing communications network according to the present invention is similar to the first configuration wherein the first terminal station modulates a signal light having at least one wavelength according to the supervisory signal, multiplexes a signal light having a plurality of wavelengths containing the modulated signal light, transmits the resultant signal light to the second terminal station. The second terminal station selects a wavelength from the received signal light, receives the supervisory signal, modulates a signal light having at least one wavelength according to the received supervisory signal, multiplexes the signal light having a plurality of wavelengths containing the modulated signal light, and transfers the signal light to the third terminal station.

The fourth configuration of the supervisory system in the wavelength division multiplexing communications network according to the present invention is similar to the first configuration wherein the first terminal station modulates a signal light having at least one wavelength according to the supervisory signal, transmits the signal light to the second terminal station. The second terminal station converts the wavelength of the received signal light into a different wavelength, and transfers it to the third terminal station.

The fifth configuration of the supervisory system in the wavelength division multiplexing communications network according to the present invention is similar to the third configuration wherein the second terminal station opto-electrically converts the signal light having at least one wavelength modulated according to the supervisory signal transmitted from the first terminal station to regenerate the supervisory signal, and modulates the signal light having a wavelength different from the at least one wavelength according to the regenerated supervisory signal.

The sixth configuration of the supervisory system in the wavelength division multiplexing communications network according to the present invention is similar to the third configuration wherein the second terminal station determines the necessity of transfer according to the supervisory signal, and stops the transfer of the supervisory signal when the transfer is not required.

The seventh configuration of the supervisory system in the wavelength division multiplexing communications network according to the present invention is similar to the sixth configuration wherein the supervisory signal contains identification information which identifies the source terminal station and the destination optical repeater unit of a signal. The second terminal station reads the identification information about the supervisory signal, transfers the supervisory signal when the optical repeater unit exists in the transmission direction of the signal, and does not transfer the supervisory signal when the optical repeater unit does not exist.

The eighth configuration of the supervisory system in the wavelength division multiplexing communications network according to the present invention is similar to the first or third configurations wherein an optical path is formed in such a way that the supervisory signal transmitted from the first terminal station passes through the plurality of optical repeater units.

Furthermore, the ninth configuration of the supervisory system in the wavelength division multiplexing communications network according to the present invention includes a first and a second terminal stations, a first optical transmission line for connecting the first terminal station to the second terminal station, at least one optical wavelength multiplexing/demultiplexing unit provided in the first optical transmission line, at least one of the third terminal stations connected to at least one optical wavelength multiplexing/demultiplexing unit through the second optical transmission line, and an optical repeater unit provided in the first and second optical transmission lines. In the wavelength division multiplexing communications network for establishing wavelength division multiplexing communications between the first and second terminal stations and at least one of the third terminals station, an optical path is formed as follows. That is, the first terminal station transmits an optical signal on which the supervisory signal for the optical repeater unit is superposed to one of the adjacent third terminal stations. The third terminal station transfers an optical signal on which the supervisory signal is superposed sequentially to the adjacent terminal stations, and transfers the optical signal on which the supervisory signal is superposed from the last third terminal station to the adjacent second terminal station. The second terminal station transmits the optical signal on which the supervisory signal is superposed to the first terminal station.

Furthermore, the tenth configuration of the supervisory system in the wavelength division multiplexing communications network according to the present invention is similar to the ninth configuration wherein an optical signal on which the supervisory signal is superposed passes through the first and second terminal stations and at least one of the third terminal stations, and has a fixed wavelength.

Furthermore, the eleventh configuration of the supervisory system in the wavelength division multiplexing communications network according to the present invention includes a first and a second terminal stations, first optical transmission up-line and down-line for connecting the first terminal station to the second terminal station, at least one optical wavelength multiplexing/demultiplexing unit provided in the first optical transmission up-line and down-line, at least one of the third terminals station connected to at least one optical wavelength multiplexing/demultiplexing unit through the second optical transmission up-line and down-line, and an optical repeater unit provided in the first and second optical transmission up-line and down-line. With this configuration, each of the first and second terminal stations and at least one of the third terminal stations transmits an optical signal on which the supervisory signal for the optical repeater unit is superposed to the adjacent terminal station through at least one of the optical wavelength multiplexing/demultiplexing units via the path which passes the corresponding optical transmission up-line and down-line.

Furthermore, the twelfth configuration of the supervisory system in the wavelength division multiplexing communications network according to the present invention is similar to the eleventh configuration wherein the second terminal station and at least one of the third terminal stations output with the wavelength different from the input wavelength of the input supervisory signal.

The thirteenth configuration of the supervisory system in the wavelength division multiplexing communications network according to the present invention includes a first terminal station, an optical wavelength multiplexing/demultiplexing unit for wavelength-multiplexing/demultiplexing an optical signal transmitted from the first terminal station, a second and a third terminal stations for receiving the optical signal branched by the optical wavelength multiplexing/demultiplexing unit. With this configuration, the first optical path connects the first terminal station to the optical wavelength multiplexing/demultiplexing unit and is branched at the optical wavelength multiplexing/demultiplexing unit to the second and the third terminal stations The second optical path connects each of the second and the third terminal stations to the optical wavelength multiplexing/demultiplexing unit. Thus, the branches of the second path are combined at the optical wavelength multiplexing/demultiplexing unit and reach the first terminal station. Then, the first and the second optical paths pass the signal light modulated according to a supervisory signal.

Furthermore, the fourteenth configuration of the supervisory system in the wavelength division multiplexing communications network according to the present invention includes a first and a second terminal stations, at least one of the first optical wavelength multiplexing/demultiplexing units provided in optical transmission up-line and down-line for connecting the first and the second terminal stations, a first path containing at least one of the third terminal stations connected to at least one of the first optical wavelength multiplexing/demultiplexing units through the optical transmission up-line and down-line, and a fourth and a fifth terminal stations, at least one of the second optical wavelength multiplexing/demultiplexing units provided in optical transmission up-line and down-line for connecting the fourth and the fifth terminal stations, a second path containing at least one of the sixth terminal stations connected to at least one second optical wavelength multiplexing/demultiplexing unit through the optical transmission up-line and down-line. In the optical wavelength division multiplexing communications network for establishing optical wavelength division multiplexing communications through the second path, an optical path is formed as follows. That is, the first terminal station transmits an optical signal on which a supervisory signal is superposed to one of the adjacent third terminal stations. The third terminal station transfers an optical signal on which the supervisory signal is superposed stage by stage to the adjacent terminal stations. Then, the optical signal on which the supervisory signal is superposed is transferred from the last third terminal station to the adjacent second terminal station. The second terminal station transmits the optical signal on which the supervisory signal is superposed to the fourth terminal station. The fourth terminal station transmits the optical signal on which the supervisory signal is superposed to one of the adjacent sixth terminal stations. The sixth terminal station transfers the optical signal on which the supervisory signal is superposed stage by stage to the adjacent terminal stations. The optical signal on which the supervisory signal is superposed is transferred from the last sixth terminal stations to the adjacent fifth terminal stations.

Furthermore, the fifteenth configuration of the supervisory system in the wavelength division multiplexing communications network according to the present invention is similar to the fourteenth configuration wherein an optical signal on which the supervisory signal is superposed passes through the terminal stations, and has a fixed wavelength.

The sixteenth configuration of the supervisory system in the optical wavelength division multiplexing communications network according to the present invention includes a plurality of optical wavelength multiplexing/demultiplexing units connected in a ring through an optical transmission line, and a plurality of terminal stations respectively connected to the plurality of the optical wavelength multiplexing/demultiplexing unit. In the optical wavelength division multiplexing communications system, an optical path is formed in such a way that a light on which a supervisory signal is superposed passes through the plurality of adjacent terminal stations through the plurality of optical wavelength multiplexing/demultiplexing units.

Furthermore, the seventeenth configuration of the supervisory system in the wavelength division multiplexing communications network according to the present invention is similar to the sixteenth configuration wherein an optical signal on which the supervisory signal is superposed passes through the terminal stations, and has a fixed wavelength.

The eighteenth configuration of the supervisory system in the optical wavelength division multiplexing communications network according to the present invention includes a plurality of terminal stations respectively connected to a plurality of optical wavelength multiplexing/demultiplexing units. The plurality of the optical wavelength multiplexing/demultiplexing units are connected in a ring shape through optical transmission up-line and down-line. In the optical wavelength division multiplexing communications system for establishing optical wavelength division multiplexing communications among terminal stations, an optical signal on which the supervisory signal is superposed is passed through a path connecting the adjacent terminal stations through the optical wavelength multiplexing/demultiplexing unit via an optical transmission up-line, and a path connecting the adjacent terminal stations through the optical wavelength multiplexing/demultiplexing unit via an optical transmission down-line.

The nineteenth configuration of the supervisory system in the optical wavelength division multiplexing communications network according to the present invention is similar to the eighteenth configuration wherein the wavelength of the supervisory signal passing through the optical transmission up-line is different from the wavelength of the light passing through the optical transmission down-line.

The twentieth configuration of the supervisory system in the optical wavelength division multiplexing communications network according to the present invention includes a plurality of optical wavelength multiplexing/demultiplexing units, a plurality of terminal stations respectively connected to a plurality of optical wavelength multiplexing/demultiplexing units. The plurality of the optical wavelength multiplexing/demultiplexing units are connected in a ring shape through optical transmission up-line and down-line. In the optical wavelength division multiplexing communications system for establishing optical wavelength division multiplexing communications among terminal stations, optical up-path and down-path connecting two adjacent terminal stations are formed. The up-path and the down-path are assigned to difference fibers. An optical main signal modulated according to the supervisory signal is passed through the optical path.

The twenty-first configuration of the supervisory system in the optical wavelength division multiplexing communications network according to the present invention is similar to the twentieth configuration wherein the wavelength of a signal in 2N optical paths selected in transmitting a supervisory signal has a fixed wavelength.

The twenty-second configuration of the supervisory system in the optical wavelength division multiplexing communications network according to the present invention is similar to any of the first through twenty-first configurations wherein the light for a supervisory control is modulated according to a data signal, and the supervisory signal is superposed on the data signal.

The twenty-third configuration of the supervisory system in the optical wavelength division multiplexing communications network according to the present invention is similar to any. of the first through twenty-first configurations wherein the light for a supervisory control is exclusively used for a supervisory signal.

The twenty-fourth configuration of the supervisory system in the optical wavelength division multiplexing communications network according to the present invention is similar to any of the first through twenty-first configurations wherein a supervisory signal receiving unit in a repeater unit has a filter which passes only a signal light modulated according to a supervisory signal.

The twenty-fifth configuration of the supervisory system in the optical wavelength division multiplexing communications network according to the present invention is similar to any of the first through third configuration of the present invention wherein an optical repeater unit includes a plurality of optical amplifiers, and each of the optical amplifiers which receives a supervisory signal transfers the supervisory signal to the other optical amplifiers.

The twenty-sixth configuration of the supervisory system in the optical wavelength division multiplexing communications network according to the present invention is similar to the eleventh configuration includes at least one optical wavelength multiplexing/demultiplexing unit, a plurality of terminal stations connected to at least one optical wavelength multiplexing/demultiplexing unit through an optical transmission line, and a plurality of optical repeater units provided in the optical transmission line. A second terminal station receives a supervisory signal for the optical repeater unit transmitted from a first terminal station of the plurality of terminal stations through the optical wavelength multiplexing/demultiplexing unit, and transfers the received supervisory signal to a third terminal station through the optical wavelength multiplexing/demultiplexing unit. The wavelength of the supervisory signal passing through the terminal stations is fixed in all the terminal stations.

The twenty-seventh configuration of the supervisory system in the optical wavelength division multiplexing communications network according to the present invention is similar to the eighteenth configuration wherein the wavelength of the supervisory signal passing through the optical transmission up-line is the same as the wavelength of the supervisory signal passing through the optical transmission down-line.

The twenty-eighth configuration of the supervisory system in the optical wavelength division multiplexing communications network according to the present invention is similar to any of the first through the twenty-seventh configurations wherein the wavelength of a signal modulated according to a supervisory signal can be switched depending on the position of a repeater unit to be monitored.

The twenty-ninth configuration of the supervisory system in the optical wavelength division multiplexing communications network according to the present invention is similar to the twenty-eighth configuration wherein the supervisory signal receiving unit of the repeater unit has a filter for passing only the light of a signal modulated according to the supervisory signal.

The supervisory system in the WDM transmission system according to the present invention is based on the configuration in which a hub station for issuing and terminating an SV signal, a branch station for looping back the SV signal, and a repeater unit for relaying an optical signal are connected through an optical transmission line. The SV signal is transmitted from the hub station along a channel exclusively used for the SV signal, and the SV signal is looped back by the branch station, thereby forming a path which passes the SV signal through all repeater units connected to the system.

The terminal stations used in the system according to the present invention includes at least a switch for switching an optical path and a repeater unit monitor device for generating an SV signal, and operates the switch to switch the transmission line when the SV signal is looped back and when the SV signal is transmitted or terminated. When the SV signal is transmitted, the SV signal generated by the repeater unit monitor device is converted into an optical signal for transmission.

According to such a system or a terminal station of the present invention, it is not necessary to branch an SV signal and transmit it to each terminal station. That is, the optical path of the SV signal is changed to transmit the signal to a terminal station, and loop it back to pass through all the repeater units connected in the system. Accordingly, there is no problem of the deterioration of the SV signal from a branching operation, and the number of channels used in transmitting an SV signal is not so large as the number of the terminals.

Especially, according to the present invention, one channel can be used in transmitting an SV signal. Therefore, a number of channels are not exclusively required for the SV signal, or limit a transmission band. Therefore, a number of channels can be used in transmitting a main signal.

Furthermore, since a terminal station according to the present invention can either loop back an SV signal or transmit it, any terminal station can be a hub and branch station. Therefore, the SV signal can be transmitted through an appropriate transmission line formed depending on the position of a repeater unit to which the SV signal is transmitted.

BRIEF DESCRIPTION OF THE DRAWINGS

FIG. 1 shows the configuration of a point-to-point type transmission line;

FIGS. 2A through 2C show examples of the operation of the optical amplification repeater unit in a supervisory signal superposing system;

FIGS. 3A and 3B show examples of the operation of the optical amplification repeater unit in a supervisory signal wavelength division multiplexing system;

FIGS. 4A and 4B show examples of a serial optical transmission system in a network using the wavelength division multiplexing (WDM) technology and the concept of an OTDR path in the optical repeater unit;

FIG. 5 shows a ring-type optical transmission system in a network using the wavelength division multiplexing (WDM) technology;

FIG. 6 shows an example of a path through which a supervisory signal passes in the optical transmission system shown in FIG. 4A;

FIG. 7 shows another example of a path through which a supervisory signal passes in the optical transmission system shown in FIG. 4A;

FIG. 8 shows a further example of a path through which a supervisory signal passes in the optical transmission system shown in FIG. 4A;

FIGS. 9A through 9C show an embodiment of the present invention;

FIG. 10 shows an example of the configuration of the wavelength multiplexing module and the demultiplexing module;

FIGS. 11A through 11C show examples of the configurations for transmission and loop-back of an SV signal in a terminal station;

FIG. 12 shows a configuration with which a response signal is received in a terminal station;

FIG. 13 shows an example of the configuration with which an SV signal is received and a response signal is transmitted in a repeater unit;

FIG. 14 shows a general configuration of the SV signal receiving circuit shown in FIG. 13;

FIG. 15 is a block diagram explaining the transfer of a supervisory signal as the first feature of the present invention;

FIG. 16 explains the function of transferring a supervisory signal in a terminal station;

FIG. 17 shows an example of an optical path formed in such a way that a supervisory signal passes through all transmission lines;

FIG. 18 shows an example of assigning a wavelength for supervisory control;

FIG. 19 shows the concept of the first embodiment according to the present invention;

FIG. 20 is a block diagram showing the embodiment shown in FIG. 19;

FIG. 21 is a block diagram showing the principle of realizing the function of transferring a supervisory signal in an optical transmitting/receiving terminal station;

FIG. 22 is a block diagram showing an example of the configuration of the optical transmitting/receiving terminal station having the function of transferring the supervisory signal shown in FIG. 21;

FIG. 23 is another block diagram showing an example of the configuration of the optical transmitting/receiving terminal station having the function of transferring the supervisory signal shown in FIG. 21;

FIG. 24 is a block diagram showing an example of the configuration in which repeater units in a network can be monitored from a terminal station;

FIG. 25 is a block diagram showing an embodiment forming an optical path for a supervisory signal;

FIG. 26 is a block diagram showing an embodiment obtained by modifying the embodiment shown in FIG. 25;

FIG. 27 is a block diagram of an embodiment obtained by modifying the embodiment shown in FIG. 26;

FIG. 28 shows an example of a configuration of realizing a branch and a coupling of a supervisory signal light in the optical wavelength multiplexing/demultiplexing unit 1 and 2 shown in FIG. 27;

FIG. 29 is a block diagram showing an embodiment of forming optical up-path and down-path connecting two adjacent terminal stations to pass a signal light modulated according to a supervisory signal;

FIG. 30 is a block diagram showing an example of the configuration in which a supervisory signal is received by an optical amplifier of a repeater unit which cannot directly receive the supervisory signal;

FIG. 31 is a block diagram showing an example of the configuration of an optical transmitting/receiving terminal station capable of routing a supervisory signal; and FIGS. 32A and 32B show examples of the configurations of the optical wavelength multiplexing/demultiplexing unit in each embodiment of the present invention.

DESCRIPTION OF THE PREFERRED EMBODIMENTS

FIGS. 9A through 9C show examples of embodiments according to the present invention.

FIG. 9A shows the first embodiment of the present invention in which four terminal stations are provided. That is, hub stations A and B and branch stations 1 and 2 correspond to respective terminal stations. According to the present embodiment, one channel is provided for SV signal transmission to loop back an SV signal at each branch station and connect a communications line to a hub station which is a source station of the SV signal.

That is, the SV signal output from the hub station A is not terminated by the branch stations 1 and 2, but is looped back and terminated by a hub station B which is a source station of the SV signal. An SV signal output from the hub station B is looped back by the branch stations 1 and 2, and terminated by the hub station A. When the SV signal is transmitted from the hub stations A and B, it is turned by the optical wavelength multiplexing/demultiplexing unit 10 and transmitted to the branch stations 1 and 2.

There are a plurality of repeater units (not shown in FIGS. 9A through 9C) provided among the hub stations A and B, branch stations 1 and 2, and the optical wavelength multiplexing/demultiplexing unit 10. The SV signal is designed to pass through all these repeater units. Therefore, a path is formed in such a way that the SV signal is not terminated at each terminal station, but is looped back to pass through all repeater units and terminated at an appropriate terminal station. Thus, one channel is enough to transmit an SV signal in a system in which a plurality of terminal stations are connected. Only one channel is required because there are only the source hub station A and the destination hub station B in the system. Therefore, since it is not necessary to branch an SV signal, the number of channels can be smaller than the number of terminal stations, thereby avoiding a waste of bands.

The hub stations A and B transmit and terminate an SV signal. A response signal from a repeater unit is superposed on the main signal, transmitted through the main circuit, and received by a terminal station in which a repeater unit which has issued a response signal is connected trough the main circuit. Therefore, the terminal station has the function of obtaining the state (input/output state, temperature, etc.) of the repeater unit.

FIG. 9B shows an example of the configuration of the optical wavelength multiplexing/demultiplexing unit.

As shown in FIG. 9B, the optical wavelength multiplexing/demultiplexing unit 10 comprises a demultiplexing module 11-1, 11-2, and a multiplexing module 12-1, 12-2. An optical signal input to the demultiplexing module 11-1 is branched to a line containing only a main signal and a line containing an SV signal and is connected to a branch station. An optical signal input to the demultiplexing module 11-2 is also branched to a line containing an SV signal and is connected to a branch station and a line containing only a main signal. The multiplexing module 12-1 receives an optical signal of a line containing only a main signal from the demultiplexing module 11-1 and an optical signal containing an SV signal looped back from a branch station, and multiplexes and transmits them to a hub station. Similarly, a line containing only a main signal from the demultiplexing module 11-2 and a line containing an SV signal from a branch station are connected to the multiplexing module 12-2. The multiplexing module 12-2 multiplexes the optical signals and transmits them to a hub station.

FIG. 9C shows an example of another embodiment of the present invention.

With the configuration shown in FIG. 9C, the hub station B does not terminate an SV signal, but loops it back like a branch station. FIG. 9A shows the configuration in which two hub stations are provided for comprehensibility. However, the present invention can fundamentally function using one hub station only.

That is, an SV signal is issued and received by the same terminal station. This is equivalent to a set of a source terminal station and a destination terminal station for an SV signal. Therefore, only one channel is required for an SV signal. Furthermore, since the signal is looped back by each of the branch station and the hub station, it can be designed to pass through all repeater units (not shown in FIG. 9) in the system.

Thus, providing a source and a loop-back path at a terminal station for an SV signal allows any terminal station to be used as a hub station and a branch station. Therefore, the terminal stations can be sequentially switched one after the other to be used as a hub station.

An SV signal is not constantly transmitted, but is output as necessary. Since the SV signal is wavelength-division-multiplexed to a main signal for transmission, the optical output of the entire optical signal depends on whether the SV signal is not transmitted or the SV signal is transmitted as a main signal. As a result, the transmission characteristic is quite different between the cases. Therefore, when the SV signal is not transmitted, a pseudo-signal whose output is equivalent to that of the SV signal is transmitted to keep the output of the entire optical signal constant. Thus, the transmission characteristic can be prevented from deteriorating with a change of optical output.

As described above, it is not necessary to branch an SV signal by looping back the SV signal at a terminal station according to the present invention, the SV signal can be transmitted to all repeater units without attenuating optical output. Therefore, only one channel is required to transmit an SV signal, and can avoid a waste of communications bands along a number of channel for the SV signal.

When an optical fiber is checked in the OTDR method by designing the path of an SV signal in a way that the SV signal passes through all terminal stations and repeater units according to the present invention, all paths can be checked using the wavelength of the SV signal. Therefore, only one of the plurality of terminal stations should issue an optical signal based on the OTDR method. As a result, the optical fiber system can be easily checked in the OTDR method.

FIG. 10 shows an example of the configuration of a multiplexing module and a demultiplexing module.

An input optical signal is output to a fiber grating 21-1 through a circulator 22-1. In the fiber grating 21-1, the wavelength (drop wavelength), whose line should be switched, of the optical signal and the SV signal is reflected, input to the circulator 22-1 again, and output to the DROP direction. The light of a wavelength other than the drop wavelength and the SV wavelength passes through the fiber grating 21-1 as is, also passes through an isolator 20, and is input to the multiplexing module 12.

An optical signal directly received from the demultiplexing module 11 passes a fiber grating 21-2 as is, passes a circulator 22-2, and is transmitted to an output side. On the other hand, an SV signal or a main signal from the branch station are input from the ADD side to the multiplexing module 12, and are input to the fiber grating 21-2 through the circulator 22-2. In the fiber grating 21-2, optical signals of the wavelength (add wavelength) of the main signal to be multiplexed with the wavelength of the SV signal are reflected and input to the circulator 22-2.

The isolator 20 is provided between the demultiplexing module and the multiplexing module to prevent a part of an optical signal from propagating backward in the line when the optical signal from ADD is not completely reflected by the fiber grating 21-2 and a part of the optical signal passes through the fiber grating 21-2.

Thus, a part of the input SV signal and the main signal is output toward DROP and transmitted to a branch station. The SV signal and the main signal from the branch station are input from ADD to the multiplexing module 12, and multiplexed with the optical signal directly input from the demultiplexing module 11 and transmitted for output. The hub station B can be provided as shown in FIG. 9A on the output side, or the hub station B can function as the branch station for looping back an SV signal as shown in FIG. 9C.

The configuration of the demultiplexing module 11 or the multiplexing module 12 shown in FIG. 10 is an example, and is not limited to this application.

FIGS. 11A through 11C show an example of the configuration in which an SV signal is transmitted or looped back in a terminal station.

FIG. 11A shows an example of the configuration (1R configuration) with which an SV signal is looped back as an optical signal.

Noises, etc. are removed from an input SV signal when the signal passes through a band pass filter 25. Then, the signal is transmitted to an optical amplifier 26. The optical amplifier 26 amplifies the SV signal as an optical signal. By closing an optical switch 27, the SV signal from the optical amplifier 26 is output as is, and looped back by a terminal station (branch station).

By keeping the optical switch 27 open, a repeater supervising device 29 issues an SV commend, and an SV signal transmitter 28 generates an SV signal of an optical signal, and outputs it through the optical switch 27. At this time, the repeater supervising device 29 opens the optical switch 27 through a control line 30.

With the above described configuration, a terminal station can be a branch station for looping back an SV signal and can be a hub station for transmitting the SV signal.

FIG. 11B shows an example of the configuration (2R configuration) with which an SV signal is looped back after its waveform is reshaped.

Only the SV signal is extracted from the input optical signal by the band pass filter 25, and converted into an electrical signal by a photodiode 31. An analog switch is provided for an identification circuit 32. When the switch is closed, a signal is received from the photodiode 31. After reshaping the waveform of the signal, it is transmitted to an SV signal transmitter 33. The SV signal transmitter 33 converts the electrical signal into an optical signal, and outputs the result to the output side. Thus, the function of the branch station with the 2R configuration can be performed.

When the analog switch in the identification circuit 32 is open, an SV command signal (electrical signal) from the repeater supervising device 29 is input to the identification circuit 32, and transmitted to the SV signal transmitter 33. The SV signal transmitter 33 converts the electrical signal into an optical signal and outputs it to the output side as described above. Thus, the function of a hub station can be successfully performed.

FIG. 11C shows an example of the configuration (3R configuration) with which an SV signal is synchronized and looped back. Only the SV signal is extracted from the input optical signal by the band pass filter 25. The extracted SV signal is converted into an electrical signal by the photodiode 31. The electrical signal is transmitted to the identification circuit 32. A negative feedback is applied by a PLL circuit 34 between the photodiode 31 and the identification circuit 32, the waveform is reshaped by the identification circuit 32, and the signal is transmitted to the SV signal transmitter 33 by retiming the SV signal. Thus, the waveform and the phase of the SV signal which have been deteriorated during the transmission are adjusted. Then, the SV signal is converted into an optical signal by the SV signal transmitter 33 for output.

When a terminal station is a hub station, the analog switch in the identification circuit 32 is open as described above, a signal from the repeater supervising device 29 is passed to the SV signal transmitter 33, and is converted into an optical signal for output.

FIG. 12 shows the configuration in which a response signal is received by a terminal station.

The configuration in which a response signal is received includes, as shown in FIG. 12, an optical amplifier 35; a photodiode 36, an electric amplifier 37, a low-pass filter 38, and a frequency counter 39. Since the optical signal input through a transmission line is attenuated through the propagation in the transmission line, it is amplified by the optical amplifier 35. The optical signal amplified by the optical amplifier 35 is converted into an electrical signal by the photodiode 36, and then amplified by the electric amplifier 37.

Actually, a circuit for extracting a main signal is provided in parallel with a circuit for extracting a response signal. However, the circuit for extracting the main signal is not shown in FIG. 11B because the configuration in which a response signal is received is mainly described here. That is, since a response signal is superposed on a main signal, the entire signal containing the response signal is processed up to this stage.

A signal amplified by the electric amplifier 37 is passed through the low-pass filter 38, and only a response signal is extracted from the entire signal. The cut-off frequency of a low-pass filter is, for example, several 10 kHz. Passing the signal through the low-pass filter 38 removes the components of the main signal, noises, etc. The frequency of the response signal extracted by the low-pass filter 38 is measured by the frequency counter 39.

In a terminal station (a station for receiving a response signal regardless of a branch or a hub station), a correspondence table between the frequency of a response signal and a monitor value of each state of a repeater unit is preliminarily stored. The state of the repeater unit which returns a response signal can be obtained from the frequency of the response signal obtained as described above.

FIG. 13 shows an example of the configuration in which an SV signal is received and a response signal is transmitted through a repeater unit.

An up-line and a down-line are connected to the repeater unit, and are respectively provided with an SV receiving circuit and a response signal transmission circuit.

An optical signal input through the repeater unit passes through couplers 40-1 and 40-4, and are amplified by erbium doped fiber amplifiers 46-1 and 46-2. The amplified optical signal is branched by the couplers 40-2 and 40-5, converted into an electrical signal by photodiodes 42-1 and 42-2, and input to electric amplifiers 47-1 and 47-2. The electrical signal amplified by the electric amplifiers 47-1 and 47-2 is input to laser diodes 41-1 and 41-2, and multiplexed with an input light by the couplers 40-1 and 40-4. Thus, the path includes the couplers 40-1, 40-2, 40-4, and 40-5, the photodiodes 42-1 and 42-2, the electric amplifiers 47-1 and 47-2, and the laser diodes 41-1 and 41-2, and applies a negative feedback to the erbium doped fiber amplifiers 46-1 and 46-2. The optical signal output from the couplers 40-2 and 40-5 is controlled to be a constant level.

The optical signal output from the couplers 40-2 and 40-5 is branched by the couplers 40-3 and 40-6, and the wavelength of the SV signal is extracted through optical filters 43-1 and 43-2. The extracted SV signal is converted into an electrical signal by the photodiodes 42-3 and 42-4, and passes through electric filters 44-1 and 44-2 of a narrow band to remove noises.

Thus, the extracted SV signal is received as an electrical signal by SV receiving circuits 45-1 and 45-2. The SV receiving circuits 45-1 and 45-2 extract the repeater unit number contained in the SV signal. If the number refers to its own repeater unit, the SV command is extracted from the SV signal, the state of the repeater unit is obtained according to the command, and a response signal is generated. The generated response signal is converted into an optical signal by the laser diodes 41-1 and 41-2, and superposed on the main signal for transmission. The response signal can be transmitted between the SV receiving circuits 45-1 and 45-2. Each of the SV receiving circuits 45-1 and 45-2 can transmit response signals to both up-line and down-line.

Particularly, the SV signal extracted through the optical filters 43-1 and 43-2 and the main signal are transmitted along different channels. The response signal output from the SV receiving circuit is converted into an optical signal by the laser diodes 41-1 and 41-2, and superposed on the main signal for transmission to the output terminal of the repeater unit.

FIG. 13 shows an example of the repeater unit in the 1R system using an erbium doped fiber amplifier. This system can be replaced with the 2R system in which an optical signal is converted into an electrical signal, and waveform reshaped for transmission, or with the 3R system in which the phase conformity as well as the waveform reshaping is performed.

FIG. 14 shows the general configuration of the SV receiving circuit shown in FIG. 13.

The SV receiving circuit is an electric circuit, and comprises an amplifier 50, a demodulation circuit 51, an interface circuit 52, an SV signal identification circuit 53, and a response signal generation unit 54.

The SV signal input to the SV receiving circuit shown in FIG. 14 is amplified by the amplifier 50 and transmitted to the demodulation circuit 51. The SV signal demodulated by the demodulation circuit 51 is transmitted to the interface circuit 52 and the demodulation circuit of the SV receiving circuit in the opposite line, and used as a signal demodulated by the demodulation circuit in the opposite line. An opposite line refers to a down-line to an up-line, and an up-line to a down-line. Therefore, a xxx circuit in the opposite line refers to a corresponding circuit in the SV receiving circuit in the down-line if the SV receiving circuit shown in FIG. 14 is provided in the up-line. If it is provided in the down-line, then it refers to a corresponding circuit in the up-line.

The interface circuit 52 retrieves information contained in the SV signal transmitted from the demodulation circuit 51. That is, the SV signal contains a repeater unit number, a supervisory control command, etc. which are extracted in a predetermined format. Furthermore, a repeater unit number and a supervisory control command of the SV signal received in the opposite line are also transmitted to the interface circuit 52 and then to the next interface circuit 52. The SV signal identification circuit 53 determines whether or not the repeater unit number contained in the SV signal belongs to its own circuit. If not, the signal is not transmitted to the next stage, but terminated in this circuit. The SV signals S not branched in the couplers 40-3 and 40-6 are transmitted to the next repeater unit.

If the repeater unit number of the repeater unit belonging to the SV signal identification circuit 53 is set therein, the SV signal identification circuit 53 translates the supervisory control command and obtains the state of its own repeater unit. Then, it transmits a signal indicating the state of its own repeater unit to the response signal generation unit 54, generates a signal of the frequency indicating the state of its repeater unit, and outputs it to the LD drive circuit including a laser diode (LD). The response signal generation unit 54 also transmits and receives a signal to and from the response signal generation unit in the opposite line so that the same response signal can be generated in the up-line and the down-line.

With the configuration of looping back an SV signal at a terminal station by branching the SV signal through an optical wavelength multiplexing/demultiplexing unit, only one channel is required to transmit an SV signal even if a number of terminal stations are connected through the optical wavelength multiplexing/demultiplexing unit, thereby avoiding a waste of a number of channels exclusively used for transmission of an SV signal. As a result, a communications band can be efficiently used.

FIG. 15 is a block diagram explaining the transfer of a supervisory signal as the first feature of the present invention. In the attached drawings below, the same or similar units are assigned the same reference number.

In this embodiment, the transfer of a supervisory signal refers to transmitting a supervisory signal by a terminal station, receiving it by another terminal station, and then transferring it to a repeater unit. In FIG. 15, a pair of optical fibers OPC 1 and OPC 2 are connected as an up-line and a down-line to four terminal stations A, B, C, and D through optical wavelength multiplexing/demultiplexing units 61 and 62.

For example, if a signal light having a wavelength $W_2$ is modulated according to a supervisory signal and transmitted by the terminal station A, the supervisory signal can be transmitted only to the repeater unit (not shown in FIG. 15) provided between the terminal stations A and C. However, if the supervisory signal is transferred from the terminal station C to the terminal station D, then the supervisory signal, which is a command signal, can also be transmitted to a repeater unit (not shown in FIG. 15) provided between the terminal stations C and D.

A signal light modulated according to the supervisory signal can be from the main signal, or a light exclusive for a supervisory signal. The supervisory signal can be transferred by providing the function of transferring the supervisory signal in each terminal station.

FIG. 16 shows an example of the general configuration of a terminal station capable of transferring a supervisory signal. In this example, the supervisory signal is superposed on a main signal having a wavelength $W_D$. In a terminal station, an optical wavelength demultiplexer 70 demultiplexes the wavelength of a signal light having a wavelength $W_D$ modulated according to the supervisory signal from a WDM signal. The lights having other wavelengths are input to a main signal processing unit (not shown in FIG. 16) corresponding to each wavelength and a main signal modulated to each wavelength is extracted.

An optical branch circuit 64 branches an optical signal having a wavelength $W_D$ into a main signal and a supervisory signal. The branched main signal is input to the main signal processing unit (not shown in FIG. 16), and the supervisory signal is input to the supervisory signal processing unit 65.

In the supervisory signal processing unit 65, an opto-electrical converter 110 converts an optical signal into an electrical signal, and a supervisory signal regeneration unit 111 regenerates the supervisory signal.

Then, the supervisory signal regenerated by the supervisory signal regeneration unit 111 is converted into a signal superposed on a bias current of a laser 67 emitted with a predetermined wavelength in a transmitting unit 66.

Therefore, the transmitting unit 66 drives a laser diode LD for emitting a light having a wavelength $W_U$ through a drive current obtained by superposing a supervisory signal on a bias current. Furthermore, the output of the laser diode LD is modulated by the external modulator 63 according to the main signal transmitted from a corresponding terminal station.

Then, the output from an external modulator 63 is input to an optical wavelength multiplexing unit 71. The optical wavelength multiplexing unit 71 multiplexes an optical signal having a different wavelength from the transmitting unit with an input light from the external modulator 63, and outputs the result to an optical transmission line.

With the configuration, a terminal station can issue its own supervisory signal from a signal processing circuit 112.

The second feature of the present invention is to extend the range in which a supervisory signal can reach an optical repeater unit. That is, a supervisory signal is transmitted to all optical repeater units in the network.

Therefore, according to the present invention, an optical path for a supervisory signal is formed in such a way that a supervisory signal transmitted from an optional terminal station passes through the entire network. The optical path is used with a terminal station capable of transferring a supervisory signal to form an optical transmission path such that the supervisory signal passes through the entire optical repeater unit.

FIG. 17 shows an example showing an optical path of a supervisory signal indicated by bold lines with arrows. Each transmission line is selected such that all terminal stations are connected through the optical path.

The optical path of a supervisory signal shown in FIG. 17 can be formed by selecting an optical path including all transmission lines from among the optical paths already formed for the main signal, or can be formed exclusively for a supervisory signal.

In this case, the following conditions should be satisfied. That is, an optical path of a supervisory signal should not overlap another path in a fiber if possible. The distance of each optical path should be as short as possible. The number of wavelengths should be as small as possible. The wavelengths to be used are identical to each other if possible.

The wavelength band at which a signal can be transmitted is limited mainly by a gain wavelength band of an optical amplifier. To effectively use the transmission band, the number of multiplexed wavelengths to be used in supervisory control should be as small as possible. Furthermore, the wavelengths to be used in supervisory control should be identical to each other if possible. For example, if the wavelengths are identical to each other, the wavelengths passing through the optical filter can be united in all optical repeater units when an optical filter is used in an optical repeater unit to receive a supervisory signal.

It is easy in a linear or ring-shaped WDM network to form an optical path for a supervisory signal to satisfy the above described conditions. For example, in the network shown in FIG. 17, wavelengths $W_3$, $W_4$, and $W_2$ are used for a supervisory signal. However, by assigning a wavelength as shown in FIG. 18, the wavelengths for supervisory control can be unified into $W_4$.

When the supervisory signal superposing system shown in FIGS. 2A through 2C is adopted, the optical path for a supervisory signal can also be used for a main signal. In the examples of a network shown in FIGS. 17 and 18, the number of optical paths for the main signal is equal to the number of those for the supervisory signal. That is, the change of the wavelength assignment does not limit the optical path of the main signal.

FIG. 19 shows the concept of the first embodiment of the present invention. The terminal stations A through D are connected to the optical wavelength multiplexing/demultiplexing units 61 and 62 through an optical repeater amplifier not shown in FIG. 19. When a supervisory signal is transmitted to the repeater unit between the terminal stations B and D, the supervisory signal is transmitted from the terminal station A to the terminal station B. Then, the supervisory signal is transferred from the terminal station B to an optical repeater amplifier to be monitored between the terminal stations B and D.

A method of transmitting a supervisory signal from the terminal station A to the terminal station B can be realized using an electric communications system. For example, in a transmission system using an SDH code, a part of the main signal data can be used as a communications line for monitor (order wire). Therefore, if a communications path for a main signal exists between two terminal stations in the WDM network, a supervisory signal can be transferred using an order wire.

FIG. 20 is a block diagram showing the embodiment in FIG. 19. A signal light having a wavelength $W_2$ among the wavelength-division-multiplexed signals (WDM signals) is modulated according to a supervisory signal, and transmitted from the terminal station A. The terminal station B receives a supervisory signal by selecting the wavelength of the signal light having a wavelength $W_2$. The terminal station B modulates the signal light having a wavelength $W_4$ according to the received supervisory signal, and then multiplexes the light with another signal light for transmission.

Thus, a supervisory signal can be transmitted from the terminal station A to repeater units (not shown in FIG. 20) between the terminal stations B and D. A signal light modulated according to a supervisory signal can be the light of the main signal, and can be an exclusive light for a supervisory signal.

Therefore, to realize this system, an optical transmitting/receiving terminal station capable of transferring a supervisory signal to repeater units is newly required.

FIG. 21 is a block diagram showing an example of the configuration for realizing the function of transferring a supervisory signal in the optical transmitting/receiving terminal station. The configuration includes the optical wavelength demultiplexer 70, the optical wavelength multiplexing unit 71, and a wavelength converter 90. A signal light having a wavelength ($W_D$) modulated according to a supervisory signal is isolated from the WDM signal having a plurality of wavelengths $W_1$ through $W_n$ received through a transmission line by the optical wavelength demultiplexing unit 70. The signal lights having other wavelengths are transmitted as is to processing units for processing other wavelengths.

The isolated signal light having the wavelength $W_D$ is converted into a signal light having the wavelength $W_U$ by the wavelength converter 90, wavelength-multiplexed by the optical wavelength multiplexing unit 71 with the WDM signal from a processing unit for other wavelengths, and transmitted through a transmission line. The wavelength converter 90 can be a circuit, etc. to which a semiconductor optical amplifier is applied.

FIG. 22 is a block diagram showing an example of the configuration of the wavelength converter 90 in the optical transmitting/receiving terminal station capable of transferring a supervisory signal shown in FIG. 21. With this configuration of a terminal station, a signal light having a wavelength $W_D$ modulated according to a supervisory signal is isolated from the WDM signal by the optical wavelength demultiplexing unit 70 as shown in FIG. 21.

When a supervisory signal is superposed on a main signal, the optical branch circuit 64 branches a signal light to a main signal processing unit (not shown in FIG. 22) and the supervisory signal processing unit 65. If the signal light is exclusively used for a supervisory signal, the optical branch circuit 64 is not required.

The supervisory signal processing unit 65 performs an opto-electrical conversion through the opto-electrical converter 110 on a signal light. The supervisory signal converted into an electrical signal is received and regenerated by the supervisory signal regeneration unit 111. Then, the electrical current superposed on the bias current of the laser diode is generated by the signal processing circuit 112 according to the received and regenerated supervisory signal.

Therefore, in the transmitting unit 66, the electrical current for the supervisory signal is superposed on the bias current from a bias current source 130, and drives the laser diode LD which emits a light having a wavelength $W_U$. Thus, the laser diode LD outputs a light having a wavelength $W_U$ which is intensity-modulated according to the supervisory signal. The light output from the laser diode LD is furthermore modulated according to the main signal by the external modulator 63, and output from the transmitting unit 66.

The output light from the external modulator 63 is multiplexed with a signal having another wavelength by the optical wavelength multiplexing unit 71, and transmitted through a transmission line. The signal processing circuit 112 can also output a supervisory signal transmitted from the repeater unit only to convert the wavelength and transmit it through the transmission line.

FIG. 23 shows an example of a variation of the configuration shown in FIG. 22. In FIG. 22, the received light having a wavelength $W_D$ is branched by the optical branch circuit 64, and the supervisory signal and the main signal are extracted in different circuits. On the other hand, FIG. 23 shows the configuration in which a main signal processing unit 69 extracts a main signal and a supervisory signal. Therefore, the optical branch circuit 64 in FIG. 22 is not provided in FIG. 23.

The configuration of the main signal processing unit 69 shown in FIG. 23 is fundamentally similar to the configuration of the supervisory signal processing unit 65 shown in FIG. 22. That is, in the supervisory signal processing unit 65 shown in FIG. 22 and the main signal processing unit 69 shown in FIG. 23, the opto-electrical converters 110 and 120, and the signal processing circuits 112 and 122 have similar functions.

The supervisory signal regeneration unit 111 shown in FIG. 22 only regenerates a supervisory signal from an electrical signal converted by the opto-electrical converter 110. However, a supervisory signal extraction circuit 121 shown in FIG. 23 can regenerate and output a main signal in addition to receiving and regenerating a supervisory signal.

In FIG. 23, the operations performed by and after the signal processing circuit 122 are similar to those shown in FIG. 22. Therefore, the descriptions are omitted here. In FIG. 23, a optical amplifier 68 is provided between the transmitting unit 66 and the optical wavelength multiplexing unit 71. It is provided as necessary depending on the level of the light output from the laser diode 67.

The signal processing circuits 112 and 122 shown in FIGS. 22 and 23 can be designed using a CPU. As a function of the signal processing circuit, it is determined whether or not a supervisory signal should be transferred. If not, no supervisory signals are transferred.

A supervisory signal contains information which identifies its source terminal station and its destination repeater unit. Therefore, the signal processing circuits 112 and 122 read the identification information, and transfers a supervisory signal if a repeater unit to be monitored exists in the signal light transmission direction. If it does not exist, no signals are transferred.

The above described functions are required to prevent the supervisory signal input to each of the repeater units from overlapping each other.

FIG. 24 is a block diagram showing an example of the configuration for forming a combination of optical paths for passing all optical transmission lines in the WDM network, passing a signal light modulated according to a supervisory signal through the formed optical path, and performing a supervisory control on a WDM network in which a repeater unit in a network can be monitored from one terminal station.

In FIG. 24, an optical path is set such that a supervisory signal can pass through all optical transmission lines using the optical signal having a wavelength $W_3$ from the terminal station A to the terminal station C, a wavelength $W_4$ from the terminal station C to the terminal station B, a wavelength $W_2$ from the terminal station B to the terminal station D, and a wavelength $W_4$ from the terminal station D to the terminal station A, with the configuration for the supervisory control shown in FIG. 20.

Therefore, for example, a supervisory signal can be transmitted from the terminal station A to all repeater units. The optical path for the supervisory signal through which the supervisory signal can be transmitted to all repeater units should meet the following conditions.

In supervisory control, an optical path should not, if possible, overlap another path in a single optical fiber in order to prevent the same supervisory signal from reaching the same repeater unit two or more times.

The distances of optical paths should be as short as possible because the shorter the distance is, the better SNR of the supervisory signal becomes for easier signal reception.

The smallest possible number of wavelengths should be used so that the transmission band can be efficiently utilized.

The wavelength should be fixed if possible. For example, when an optical filter is used for a repeater unit to receive a supervisory signal, the center wavelength of the optical filter can be unified in all repeater units if the wavelength is fixed.

It is relatively easy in a linear or ring-shaped WDM network described by referring to FIG. 4A, 4B, and 5 to form an optical path for a supervisory signal in such a way that the above described conditions can be satisfied.

Described below is an embodiment realizing the above described optical path for a supervisory signal.

FIG. 25 shows an example in a linear WDM network containing four terminal stations with the optical wavelength multiplexing/demultiplexing units 61 and 62, described later by referring to FIG. 32A, including the terminal stations A and B at both ends. Three optical paths which connect two adjacent terminal stations, and in which a signal passes from the terminal station A to the terminal station B, and an optical path which connects both end terminal stations A and B, and in which a signal passes from the terminal station B to the terminal station A are formed for transmitting a supervisory signal.

That is, in FIG. 25, optical paths for transmitting supervisory signals are formed from the terminal station A to the adjacent terminal station C, from the terminal station C to the adjacent terminal station D, from the terminal station D to the adjacent terminal station B, and from the terminal station B to the adjacent terminal station A. As a result, the signal light modulated according to the supervisory signal passes through a total of four optical paths.

Furthermore, when the optical paths are formed as described above, the optical wavelength of the supervisory signal can be fixed ($W_4$ in the example shown in FIG. 25).

FIG. 26 shows an optical path as a down-line, that is, from the terminal station B to the terminal station A connected not directly but through the terminal stations D and C. In this example shown in FIG. 26, the wavelength $W_1$ is used in the down-line.

When the optical path is thus designed, the number of wavelengths of the supervisory signals can be limited to two by setting to $W_d$ ($W_4$ in FIG. 26) the wavelength of the signal light of three optical paths in which a signal passes from the terminal station A to the terminal station B, and by setting to $W_u$ ($W_1$ in FIG. 26) the wavelength of the signal light of three optical paths in which a signal passes from the terminal station B to the terminal station A.

In this case, the number of wavelengths is larger by one than that in the embodiment shown in FIG. 25. However, the distance of each optical path can be minimized.

In the configuration shown in FIG. 26, the wavelength of the supervisory signal is used in the up-line, and another wavelength is used in the down-line. Using the optical wavelength multiplexing/demultiplexing circuit having the configuration shown in FIG. 32B described later, the transmission line connected to the terminal stations C and D requires two fiber transmission line, and the same wavelength can be applied to the up-line and down-line.

FIG. 27 shows an embodiment obtained by adding a further modification to the configuration shown in FIG. 26. In the optical path configuration shown in FIG. 26, it is necessary to use two wavelengths for a supervisory signal. If the supervisory signal pass through a path exclusive for a supervisory signal, then the supervisory signal can be transmitted to all optical repeater units using only one wavelength.

In this method, an optical path is formed as shown in FIG. 27. The signal light having a wavelength $W_4$ is used as a supervisory signal from the terminal station. The light of the supervisory signal transmitted from the terminal station A is led to the two adjacent terminal stations B and C branched in power in the optical wavelength multiplexing/demultiplexing units 61 and 62. The lights of the supervisory signals transmitted from the two adjacent terminal stations B and C are multiplexed in power with each other by the optical wavelength multiplexing/demultiplexing units 61 and 62, and input to the terminal station A. By setting such an optical path for all terminal stations, a supervisory signal having one wavelength can be transmitted to all repeater units.

FIG. 28 shows an example of the configuration for realizing the branching and the coupling of the lights of supervisory signals in the optical wavelength multiplexing/demultiplexing units 61 and 62 shown in FIG. 27. As shown in FIG. 28, the configuration includes optical wavelength demultiplexers 161 through 163, optical wavelength multiplexers 164 through 166, and optical couplers 167 and 168.

The WDM optical signal having wavelengths $W_1$ through $W_4$ transmitted from the optical fiber transmission line is demultiplexed into signals of each wavelength by the optical wavelength demultiplexer 161. When an optical signal having one of the wavelengths is applied in FIG. 23, the optical signal having a wavelength $W_4$ is branched in power by the optical coupler 167, and input to the adjacent optical wavelength multiplexer 166.

The WDM optical signal input to the optical wavelength demultiplexer 163 is demultiplexed into signals having respective wavelengths. An optical signal having one of the wavelengths among them is input to the optical coupler 168, branched in power, and input to the optical wavelength multiplexers 164 and 165. The configuration shown in FIG. 27 can be realized by the above described optical wavelength multiplexing/demultiplexing units.

FIG. 29 shows an embodiment in a linear WDM network containing N terminal stations comprising plural pairs of fibers. An up-line and a down-line optical paths (total of 2N−2) connecting adjacent two terminal stations are set, and an up-line and a down-line are assigned to different fiber transmission lines. A signal light modulated according to a supervisory signal passes through the optical path.

FIG. 29 shows an example of applying two pairs of optical fibers OFP 1 and OFP 2. A terminal station x-1 and a terminal station x-2 (x=A, B, C, and D) are provided for the same station. The terminal station x-1 is used for the optical fiber pair OFP 1 while the terminal station x-2 is used for the optical fiber pair OFP 2.

Furthermore, the optical fiber pairs OFP 1 and OFP 2 exist in the same cable.

Thus, in the linear-type WDM network having N terminal stations comprising plural pairs of fibers, an up-line and a down-line optical paths (total of 2N−2) connecting adjacent two terminal stations are set, and an up-line and a down-line are assigned to different fiber transmission lines.

A signal light modulated according to a supervisory signal passes through a total of N optical paths. It is necessary to use two wavelengths for a supervisory signal according to the embodiment shown in FIG. 26. However, when two fiber pairs OFP 1 and OFP 2 are available, an optical path is set as shown in FIG. 29 to use same wavelength for a supervisory signal.

It can also be easily realized in a ring-shaped network based on the embodiment in the above described linear network shown in FIGS. 27 and 29.

Furthermore, a supervisory signal can be transmitted from an optional terminal station to an optional repeater unit in the linear or a ring-shaped WDM network by combining the above described embodiments. In FIGS. 25 through 27, and FIG. 29, the bold lines between the terminal stations indicate the paths through which a supervisory signal is transferred.

According to the above described embodiment, it is satisfied that the optical path of the light of a supervisory signal is designed not to overlap another path, the distance of each optical path is as short as possible. The number of wavelengths to be used is as small as possible, and the wavelength to be used should be fixed, if possible.

The light of the supervisory signal is modulated according to the main signal (data signal), and can be superposed on the main signal, or exclusively used as a supervisory signal. When the optical paths of the main signal are designed in a full-mesh form (in such a way that all two terminal stations are assigned optical paths), the optical path can also be used in transmitting a main signal. Therefore, it is more effective to use optical paths in a superposing system than to use them exclusively for a supervisory signal.

Furthermore, to improve the reception sensitivity of a supervisory signal in a repeater unit, it is effective to provide an optical filter for a supervisory signal receiving unit of the repeater unit to remove unnecessary wavelength components. In this case, an optical filter can be used by setting a fixed wavelength of a supervisory signal, and the center wavelength can be uniquely specified for all repeater units.

Refer to FIG. 26 again and assume that a supervisory signal is transmitted from the terminal station A to a repeater unit between the terminal stations D and B. The terminal station A modulates the signal light having a wavelength $W_4$ according to the supervisory signal for transmission. The terminal station C receives the signal light having the wavelength $W_4$, modulates again the signal light having the wavelength $W_4$ according to the supervisory signal for transmission. That is, the supervisory signal is transferred.

Like the terminal station C, the terminal station D transfers a supervisory signal. Thus, the supervisory signal reaches the repeater unit between the terminal stations D and B. The supervisory signal circulates in the system unless the terminal station D stops transferring the supervisory signal because the supervisory signal reaches the terminal station D after it has reached a repeater unit to be monitored. That is, the same supervisory signal repeatedly reaches the repeater unit. When the optical paths overlap each other as shown in FIG. 26, there arises the problem that the supervisory signal reaches the same repeater unit twice.

Identification information is used to solve the problem. That is, the signal light having the wavelength $W_4$ reaches the terminal station B after it has reached the repeater unit between the terminal stations D and B. Therefore, the terminal station B recognizes that the signal has been transmitted from the terminal station A to the repeater unit between the terminal stations D and B according to the identification information contained in the supervisory signal. Then, it determines that further transferring the supervisory signal is not significant, and stops transferring the supervisory signal. As a result, a repeater unit does not receive the same supervisory signal twice.

With the configuration shown in FIG. 29, two pairs of optical fibers are used, and a repeater unit is provided with four optical amplifiers. However, all of the four optical amplifiers cannot receive a supervisory signal. Therefore, the repeater unit shown in FIG. 30 can be used to solve this problem.

That is, FIG. 30 shows the configuration in which a supervisory signal can be received by an optical amplifier of a repeater unit which cannot directly receive the supervisory signal. When an optical amplifier 170 receives a supervisory signal, the supervisory signal is transferred from the optical amplifier 170 to other optical amplifiers 171 through 173. Thus, an optical amplifier which cannot directly receive the supervisory signal can receive the supervisory signal.

Furthermore, FIG. 31 shows an example of the configuration of an optical transmitting/receiving terminal station capable of switching signal wavelengths modulated according to a supervisory signal depending on the position of the repeater unit to be monitored, that is, routing a supervisory signal.

When a supervisory signal is transmitted to a repeater unit between the terminal stations A and B, the signal light having a wavelength $W_2$ is modulated according to the supervisory signal for transmission. When the supervisory signal is transmitted to a repeater unit between the optical wavelength multiplexing/demultiplexing unit 61 and the terminal station C, the signal light having a wavelength $W_3$ is modulated according to the supervisory signal for transmission.

Therefore, two wavelengths $W_2$ and $W_3$ can be used for supervisory control between the terminal station A and the optical wavelength multiplexing/demultiplexing unit 61. In this case, one of the two wavelengths can be preliminarily set by a switch 80, etc. ($W_2$ in the example shown in FIG. 31) for supervisory control of the repeater unit in this area.

Otherwise, a supervisory signal can be received with only one of the wavelengths of the signal light observed by providing an optical filter for extracting only the supervisory signal to be received by the repeater unit. Thus, an optical filter to be provided for a repeater unit can be easily designed and produced.

According to each of the above described embodiments, an optical wavelength multiplexing/demultiplexing unit is designed as shown in FIG. 32A. That is, in FIG. 32A, the optical wavelength multiplexing/demultiplexing unit comprises three add-drop circuits 1 through 3. For example, each of the add-drop circuits are designed as shown in FIG. 10, and comprises two input terminals I1 and I2, and two output terminals O1 and O2.

With the optical wavelength multiplexing/demultiplexing unit 61 designed as shown in FIG. 32A using the three add-drop circuits, the branch/insertion transmission line connected to the terminal station C can be a pair of fiber transmission lines as in the above described embodiments. However, in such a case, the up-line and down-line of the pair of fiber transmission lines connected to the terminal station C should be set to different wavelengths.

On the other hand, when the optical wavelength multiplexing/demultiplexing unit is designed using two add-drop circuits as shown in FIG. 32B, the branch/insertion transmission line connected to the terminal station C can be two pairs of fiber transmission lines C1 and C2. In this case, the light from the terminal station A to the terminal station C (up-line) and the light from the terminal station C to the terminal station A (down-line) can be assigned to the same wavelength.

Furthermore, in the explanation above, a model system is a passive WDM network which does not convert a signal wavelength (optical cross-connection or a wavelength routing) in the optical wavelength multiplexing/demultiplexing unit. However, similar effects can be obtained when an active WDM network is applied according to the present invention.

Described above are the embodiments in which linear network and a combination of linear network are model systems. The present invention can be applied to any network based on these systems. For example, as in FIG. 5, a ring-shaped network can transmit a supervisory signal from an optional terminal station to a repeater unit with the configuration shown in FIGS. 25 and 26.

According to the above described embodiments of the present invention, a supervisory signal can be transmitted from an optional terminal station to an optional repeater unit in a WDM network.

Furthermore, according to the present invention, the number of wavelengths of a supervisory signal can be set to two or less. The wavelength of the supervisory signal can also be a wavelength of a main signal as necessary. Therefore, a transmission wavelength band can be effectively utilized.

Additionally, since the number of wavelengths of a supervisory signal can be limited to two or less, the power in receiving the supervisory signal by a repeater unit can be enhanced by extracting only the supervisory signal using an optical filter in the supervisory signal receiving unit of the repeater unit. That is, the supervisory signal can be easily received by the repeater unit.

What is claimed is:

1. A supervisory system in an optical wavelength-multiplexed communications network, comprising:

at least one optical wavelength multiplexing/demultiplexing unit;

a plurality of terminal stations connected to at least one optical wavelength multiplexing/demultiplexing unit through an optical transmission line, each having a loopback path to loop back a supervisory signal sent to the terminal station on a first transmission line so as to pass the supervisory signal to a second transmission line, which carries signals in an opposite direction to that of the first transmission line; and a plurality of optical repeater units provided in the first and second optical transmission line each having a supervisory signal receiving unit, to determine whether or not the supervisory signal received by the optical repeater was directed to the optical repeater and to send a response signal including information regarding a state of the optical repeater unit wherein the supervisory signal transmitted for said optical repeater units from a first terminal station of said plurality of terminal stations is received by a second terminal station through said optical wavelength multiplexing/demultiplexing unit, and the received supervisory signal is transferred to a third terminal station through said optical wavelength multiplexing/demultiplexing unit.

2. The system according to claim 1, wherein said first terminal station transmits the supervisory signal to said second terminal station through a communications line assigned to a main signal data;

said second terminal station which receives the supervisory signal modulates a signal light having at least one wavelength according to the supervisory signal, said modulated signal light having at least one wavelength is multiplexed with another signal light, and the multiplexed signal light is transferred to the third terminal station through the communications line assigned to the main signal data.

3. The system according to claim 1, wherein said first terminal station modulates a signal light having at least one wavelength according to the supervisory signal, wavelength-multiplexes the signal light having a plurality of wavelengths containing the modulated signal light, and transmits the multiplexed signal to the second terminal station; and said second terminal station receives the supervisory signal after selecting a wavelength from the received signal light, modulates a signal light having at least one wavelength according to the received supervisory signal, wavelength-multiplexes a signal light having a plurality of wavelengths containing the modulated signal light, and transfers the multiplexed signal light to the third terminal station.

4. The system according to claim 3, wherein said second terminal station determines according to the supervisory signal a necessity of a transfer of the supervisory signal, and said supervisory signal is not transferred when there is no need of the transfer.

5. The system according to claim 4, wherein said supervisory signal contains identification information which identifies a source terminal station and a destination optical repeater unit of the supervisory signal; and said second terminal station reads the identification information about the supervisory signal, transfers the supervisory signal when the destination optical repeater unit exists in a transmission direction of the signal, and does not transfer the supervisory signal when the destination optical repeater unit does not exist.

6. The system according to claim 3, wherein said second terminal station performs an opto-electrical conversion on a signal light having at least one wavelength modulated according to the supervisory signal transmitted from the first terminal station, regenerates the supervisory signal, and modulates a signal light having a wavelength different from said at least one wavelength according to the regenerated supervisory signal.

7. The system according to claim 1, wherein said first terminal station modulates a signal light having at least one wavelength according to the supervisory signal, and transmits the modulated light to the second terminal;

said second terminal station converts a wavelength of the received signal light into a different wavelength, and transfers the converted wavelength to said third terminal station.

8. The system according to claim 1, wherein optical paths are set in such a way that said supervisory signal transmitted from the first terminal station passes through the plurality of optical repeater units.

9. The system according to claim 1, wherein a light of the supervisory signal is modulated according to a data signal, and the supervisory signal is superposed to the data signal.

10. The system according to claim 1, wherein a light of the supervisory signal is exclusively used for a supervisory signal.

11. The system according to claim 1, wherein a supervisory signal receiving unit of a repeater unit comprises a filter which passes only a signal light modulated according to a supervisory signal.

12. The system according to claim 1, wherein an optical repeater unit comprises a plurality of optical amplifiers for transferring a supervisory signal from an optical amplifier which receives the supervisory signal to another optical amplifier.

13. The system according to claim 1, wherein a wavelength of a signal modulated according to a supervisory signal depending on a position of a repeater unit to be monitored can be switched.

14. The system according to claim 1, further comprising:

an optical filter for extracting only a supervisory signal light to be received.

15. A supervisory system in an optical wavelength division multiplexing communications network having a first and a second terminal station, a first optic transmission line for connecting the first and the second terminal stations, at least one optical wavelength multiplexing/demultiplexing unit provided in the first optical transmission line, at least one third terminal station connected to said at least one optical wavelength multiplexing/demultiplexing unit through a second optical transmission line, and an optical repeater unit provided in the first and second optical transmission lines each having a supervisory signal receiving unit to determine whether or not the supervisory signal received by the optical repeater unit was directed to the optical repeater unit and to send a response signal including information regarding a state of the optical repeater unit, each third terminal station having a loopback path to loop back a supervisory signal sent to the third terminal station such that a supervisory signal received at the third terminal station is sent from the third terminal station in a direction opposite to that from which it was received, wherein optical wavelength division multiplexing communications are established between the first and the second terminal stations and said at least one of the third terminal station, and wherein optical paths are set in such a way that:

said first terminal station transits an optical signal on which a supervisory signal for the optical repeater unit is supposed to one of adjacent third terminal stations;

said at least one third terminal station sequentially transfers the optical signal on which the supervisory signal is superposed to adjacent terminal stations such that a last third terminal station transfers the optical signal on which the supervisory signals is superposed to an adjacent second terminal station; and said second terminal station transmits the optical signal on which the supervisory signal is superposed to the first terminal station.

16. The system according to claim 15, wherein
said optical signal on which the supervisory signal passing through said first, second and at least one of the third terminal stations is superposed is an optical signal having a fixed wavelength.

17. A supervisory system in an optical wavelength division multiplexing communications network having a first and a second terminal station, first optical transmission up-line and down-line for connecting the first and the second terminal stations, at least one optical wavelength multiplexing/demultiplexing unit provided in the first optical transmission up-line and down-line, at least one third terminal, at least one second optical transmission up-line and down-line connecting said at least one third terminal station and said at least one optical wavelength multiplexing/demultiplexing unit, each of the terminal stations having a loopback path to loop back a supervisory signal sent to the terminal station such that a supervisory signal received on one of an up-line and a down-line is looped back on the other of the up-line and the down-line, and an optical repeater unit provided in each of the first and second optical transmission up-lines and down-lines and having a supervisory signal receiving unit to determine whether or not the supervisory signal received by the optical repeater was directed to the optical repeater and to send a response signal including information regarding a state of the optical repeater, wherein optical wavelength division multiplexing communications are established between the first and the second terminal stations and said at least one of the third terminal stations, and wherein said first and second terminal stations and said at least one of the third terminal stations transmit, through a path passing through corresponding optical transmission up-lines and down-lines, an optical signal on which the supervisory signal is superposed for the optical repeater unit to an adjacent terminal station through said at least one optical wavelength multiplexing/demultiplexing unit.

18. The system according to claim 17, further comprising:
at least one optical wavelength multiplexing/demultiplexing unit;
a plurality of terminal stations connected to at least one optical wavelength multiplexing/demultiplexing unit through an optical transmission line; and
a plurality of optical repeater units provided in the optical transmission line, wherein
a supervisory signal transmitted for said optical repeater units from a first terminal station of said plurality of terminal stations is received by a second terminal station through said optical wavelength multiplexing/demultiplexing unit, the received supervisory signal is transferred to a third terminal station through said optical wavelength multiplexing/demultiplexing unit, and an optical wavelength of the supervisory signal passing through the terminal stations is fixed in all terminal stations.

19. The system according to claim 17, wherein
said first and second terminal stations and said at least one of the third terminal stations output an optical wavelength of an input supervisory signal as a wavelength different from an input wavelength.

20. A supervisory system in an optical wavelength division multiplexing network, comprising:
a plurality of optical wavelength multiplexing/demultiplexing units; and
a plurality of terminal stations connected to respective optical wavelength multiplexing/demultiplexing units, each having a loopback path to loop back a supervisory signal sent to the terminal station such that a supervisory signal received at the terminal station is sent from the terminals in a direction opposite to that from which it was received; and
a plurality of optical repeater its, provided on the optical transmission line, each having a supervisory signal receiving unit to determine whether or not the supervisory signal received by the optical repeater was directed to the optical repeater and to send a response signal including information regarding a state of the optical repeater, wherein
said plurality of optical wavelength multiplexing/demultiplexing units are connected in a ring through an optical transmission up-line and an optical transmission down-line, and in the wavelength division multiplexing communications system which establishes optical wavelength division multiplexing communications among said stations,
optical up-path and down-path connecting two adjacent terminal stations are set;
said up-path and down-path are assigned to different fibers, and an optical main signal modulated according to the supervisory signal passes through the optical path.

21. The system according to claim 20, wherein
signals passing through 2N optical paths selected for transmission of a supervisory signal are equal in wavelength.

22. A supervisory system in an optical wavelength division multiplexing communications network, comprising:

a first terminal station;
an optical wavelength multiplexing/demultiplexing unit for multiplexing/demultiplexing a wavelength of an optical signal transmitted from said first terminal station;
a second and a third terminal stations for receiving the optical signal branched from said optical wavelength multiplexing/demultiplexing unit;
a first optical path from said first terminal station to said optical wavelength multiplexing/demultiplexing unit, and from said optical wavelength multiplexing/demultiplexing unit to each of said second and third terminal stations; and
a second optical path set from each of said second and third terminal stations to said optical wavelength multiplexing/demultiplexing unit, such that an optical signal generated by said optical wavelength multiplexing/demultiplexing unit is led to said first terminal station; and
a plurality of optical repeater units provided on the first and the second optical paths, each having a signal receiving unit to determine whether or not the supervisory signal received by the optical repeater was directed to the optical repeater and to send a response signal including information regarding a state of the optical repeater wherein
a signal light modulated according to a supervisory signal passes through said first and second optical paths, each of the second and third terminal stations having a loop back path to loop back a supervisory signal sent to the second and third terminal stations such that a supervisory signal received at the terminal station is sent from the terminal station in a direction opposite to that from which it was received.

23. An optical wavelength division multiplexing communications network which establishes optical wavelength division multiplexing communications, comprising:
a first path comprising a first and a second terminal stations, at least one of first optical wavelength multiplexing/demultiplexing units provided in optical transmission up-line and down-line connecting the first and second terminal stations, and at least one of third terminal stations connected to said at least one of the first optical wavelength multiplexing/demultiplexing units through the optical transmission up-line and down-line, each third terminal station having a loopback path to loop back a supervisory signal sent to the third terminal station each third terminal station having a loop back path to loop back a supervisory signal sent to the third terminal station on one of the optical transmission up-line and down-line, so as to pass the supervisory signal to the other of the optical transmission up-line and down-line;
a second path comprising a fourth and a fifth terminal stations, at least one of second optical wavelength multiplexing/demultiplexing units provided in optical transmission up-line and down-line connecting the fourth and fifth terminal stations, and at least one of sixth terminal stations connected to said at least one of the second optical wavelength multiplexing/demultiplexing units through the optical transmission up-line and down-line, each having a loopback path to loop back the supervisory signal sent to the sixth terminal station; and
a plurality of optical repeater units provided on the first and second path, each having a supervisory signal receiving unit to determine whether or not the supervisory signal received by the optical repeater was directed to the optical repeater and to send a response signal including information regarding a state of the optical repeater, wherein
said first terminal station transmits to one of adjacent third terminal stations an optical signal on which the supervisory signal is superposed, said third terminal station sequentially transfers to adjacent terminal stations an optical signal on which the supervisory signal is superposed and further transfers, from a last terminal station of said third terminal stations to an adjacent second terminal station, an optical signal on which the supervisory signal is superposed;
said second terminal station transmits to said fourth terminal station an optical signal on which the supervisory signal is superposed; and
said fourth terminal station to one of adjacent six terminal stations an optical signal on which the supervisory signal is superposed, said sixth terminal station sequentially transfers to adjacent terminal stations an optical signal on which the supervisory signal is superposed and further transfers, from a last terminal station of said sixth terminal stations to an adjacent fifth terminal station, an optical signal on which the supervisory signal is superposed.

24. The system according to claim 23, wherein
a wavelength of a light on which the supervisory signal passing through the terminal stations is superposed is a fixed wavelength.

25. A supervisory system in an optical wavelength division multiplexing communications network, comprising:
a plurality of optical wavelength multiplexing/demultiplexing units connected in a ring through an optical transmission line;
a plurality of terminal stations connected to respective optical wavelength multiplexing/demultiplexing units wherein optical wavelengths are multiplexed, each having a loopback path to loop back a supervisory signal sent to the terminal station such that a supervisory signal received at the terminal station is sent from the terminal station in a direction opposite to that from which it was received; and
a plurality of optical repeater units, provided on the optical transmission line, each having a supervisory signal receiving unit to determine whether or not the supervisory signal received by the optical repeater was directed to the optical repeater and to send a response signal including information regarding a state of the optical repeater, and wherein
an optical path is set such that a light on which the supervisory signal is superposed passes through a plurality of adjacent terminal stations through the plurality of optical wavelength multiplexing/demultiplexing units.

26. The system according to claim 25, wherein
said light on which the supervisory signal is superposed is similar in wavelength in each of said terminal stations.

27. A supervisory system in an optical wavelength division multiplexing communications network, comprising:
a plurality of optical wavelength multiplexing/demultiplexing units; and
a plurality of terminal stations connected to respective optical wavelength multiplexing/demultiplexing units, each having a loopback path to loop back a supervisory signal sent to the station such that a supervisory signal received at the terminal station is sent from the terminal station in a direction opposite to that from which it was received; and a plurality of optical repeater units, provided on the optical transmission line, each having a supervisory signal receiving nit to determine whether or not the supervisory signal received by the optical repeater was directed to the optical repeater and to send a response signal including information regarding a state of the optical repeater, wherein said plurality of optical wavelength multiplexing/demultiplexing units are connected in a ring through an optical transmission up-line and an optical transmission down-line; and in the wavelength division multiplexing communications system which establishes optical wavelength division multiplexing communications among said terminal stations, an optical signal on which a supervisory signal is superposed is transmitted through a path connecting through the optical transmission up-line said terminal stations adjacent through said optical wavelength multiplexing/demultiplexing units, and through a path connecting through the optical transmission down-line said terminal stations adjacent through said optical wavelength multiplexing/demultiplexing units.

28. The system according to claim 27, wherein
a wavelength of the supervisory signal passing through the optical transmission up-line is different from a wavelength of a light passing through the optical transmission down-line.

29. The system according to claim 27, wherein
a wavelength of a light of the supervisory signal passing through the optical transmission up-line is equal to a wavelength of a light of the supervisory signal passing through the optical transmission down-line.

30. A supervisory system in WDM transmission, comprising:

a hub station which is a terminal station for issuing and terminating a supervisory signal;

a branch station, having a loopback path, for looping back a supervisory signal such that a supervisory signal received at the terminal station is sent from the terminal station in a direction opposite to that from which it was received; and a repeater unit for relaying an optical signal, having a supervisory signal receiving unit to determine whether or not the supervisory signal received by the optical repeater was directed to the optical repeater and to send a response signal including information regarding a state of the optical repeater, wherein said hub station, said branch station and said repeater unit are connected through an optical transmission line;

said supervisory signal is transmitted from said hub station through at least one channel exclusively used for a supervisory signal;

said branch station loops back the supervisory signal so that the supervisory signal can pass through all repeater units connected in the system, wherein said supervisory signal is looped back in said branch station in a 3R system in which the supervisory signal is regenerated for phase matching through conversion from an optical signal into an electrical signal.

31. The system according to claim 30, wherein said supervisory signal is looped back in said branch station as an optical signal using an optical amplifier.

32. The system according to claim 30, wherein said supervisory signal is looped back in said branch station in a 2R system in which the supervisory signal is regenerated through conversion from an optical signal into an electrical signal.

33. The system according to claim 30, wherein an optical transmission line is checked by an OTDR method using a channel exclusively used for a supervisory signal.

34. The system according to claim 30, wherein said supervisory signal is transmitted along a single exclusive channel.

35. The system according to claim 34, wherein said repeater unit receives an supervisory signal using an optical filter exclusively used for an supervisory signal.

* * * * *

UNITED STATES PATENT AND TRADEMARK OFFICE
CERTIFICATE OF CORRECTION

PATENT NO.      : 6,452,701 B1
DATED           : September 17, 2002
INVENTOR(S)     : Takafumi Terahara It is certified that error appears in the above-identified patent and that said Letters Patent is hereby corrected as shown below:

Column 34,
Line 42, delete "an" and insert -- a --.

Signed and Sealed this

Eleventh Day of February, 2003

JAMES E. ROGAN
*Director of the United States Patent and Trademark Office*